(12) United States Patent
Togashi

(10) Patent No.: US 8,118,902 B2
(45) Date of Patent: Feb. 21, 2012

(54) FILTERING MEDIUM AND FILTER UNIT

(75) Inventor: Ryoichi Togashi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 100 days.

(21) Appl. No.: 12/593,081

(22) PCT Filed: Mar. 18, 2008

(86) PCT No.: PCT/JP2008/054938
§ 371 (c)(1),
(2), (4) Date: Sep. 25, 2009

(87) PCT Pub. No.: WO2008/120572
PCT Pub. Date: Oct. 9, 2008

(65) Prior Publication Data
US 2010/0083838 A1    Apr. 8, 2010

(30) Foreign Application Priority Data
Mar. 29, 2007 (JP) .................. 2007-087171

(51) Int. Cl.
*B01D 39/04* (2006.01)

(52) U.S. Cl. ......... 55/495; 55/524; 55/528; 264/172.13; 442/327

(58) Field of Classification Search ............ 442/59–417; 55/522, 361–382, 385.1–385.7, 527–528; 96/4–14; 210/483–510.1; 264/172.13
See application file for complete search history.

(56) References Cited

U.S. PATENT DOCUMENTS

| | | | |
|---|---|---|---|
| 4,973,382 A | 11/1990 | Kinn et al. | |
| 5,935,881 A * | 8/1999 | Abiru et al. | 442/97 |
| 6,419,729 B1 * | 7/2002 | Duffy et al. | 96/17 |
| 2002/0182966 A1 * | 12/2002 | Yamamoto et al. | 442/414 |
| 2003/0082972 A1 * | 5/2003 | Monfalcone et al. | 442/138 |
| 2003/0096547 A1 * | 5/2003 | Oka et al. | 442/184 |
| 2005/0079781 A1 * | 4/2005 | Tsujimoto et al. | 442/59 |
| 2005/0221708 A1 * | 10/2005 | Shigematsu et al. | 442/327 |
| 2006/0096263 A1 * | 5/2006 | Kahlbaugh et al. | 55/527 |
| 2006/0172639 A1 | 8/2006 | Yamada et al. | |

FOREIGN PATENT DOCUMENTS

| | | |
|---|---|---|
| JP | 2061195 A | 3/1990 |
| JP | 10180020 A | 7/1998 |
| JP | 2001-137630 A | 5/2001 |
| JP | 2002-001020 A | 1/2002 |
| JP | 2002-248309 A | 9/2002 |
| JP | 2004-082109 A | 3/2004 |
| JP | 2006-136809 A | 6/2006 |
| JP | 2006-187710 A | 7/2006 |
| WO | WO2004087293 A1 | 10/2004 |

OTHER PUBLICATIONS

International Search Report dated May 1, 2008, application No. PCT/JP2008/054938, 2008.

* cited by examiner

*Primary Examiner* — Duane Smith
*Assistant Examiner* — Thomas McKenzie
(74) *Attorney, Agent, or Firm* — RatnerPrestia

(57) ABSTRACT

A filtering medium is comprised of a non-woven fabric containing mainly an organic fiber, in which single fibers are fixed, wherein the non-woven fabric is constructed of a plurality of single fibers having different Young's moduli and finenesses, a non-crimped single fiber having a Young's modulus of 150 cN/dtex or more, and a fineness of 7 dtex or more is contained at a ratio of 20% or more of a total fiber mass, and single fibers are fixed with a resin having a glass transition temperature of 30° C. or more.

10 Claims, No Drawings

FILTERING MEDIUM AND FILTER UNIT

This application is a U.S. National Phase Application of PCT International Application No. PCT/JP2008/054938, filed Mar. 18, 2008, which claims priority to Japanese Patent Application No. 2007-087171, filed Mar. 29, 2007, the contents of all applications being incorporated by reference herein in their entirety.

FIELD OF THE INVENTION

The present invention relates to a filtering medium and a filter unit using the same.

BACKGROUND OF THE INVENTION

As performance required for a filter unit, there is a low pressure drop showing whether large amount of air flow is possible to be processed or not, with a capturing efficiency. An air rate penetrating through a filtering medium becomes higher year and year; it has previously been around 15 m/min, and recently, a pressure drop as usual is required in filtration at a high air rate of 25 m/min to 40 m/min which is 1.5-fold or more. For example, in a small filter unit for air conditioning, performance of 40 Pa (capturing efficiency according to dust-spot efficiency is 90%) or less is required, and in a cabin filter which is a filter unit for automobile air conditioning, performance of approximately 85 Pa (capturing efficiency of 15 kinds of dusts by JIS are around 91%) or less is required.

In addition, as to a filter unit, thinning is required, and a thin filtering medium having a low crest height by miniature-pleating has been developed as a filtering medium for processing large amount of air flow. However, the previous filtering medium has a large thickness, and has a problem that ventilation resistance caused by a material itself of the filtering medium is high and elongation easily occurs by an air pressure. For this reason, due to ventilation resistance caused by a material itself of the filtering medium and ventilation resistance caused by deformation of the filtering medium caused by an air pressure and by choking of a flow path interval through which the air flows (hereinafter, referred to as a structure pressure drop), in a filter for automobile air conditioning at a filter size of 210 W×270 L×10 D and a processing air flow of 520 m³/hr for example, a low pressure drop filter unit having performance of a capturing efficiency of 8 kinds of JIS dusts described in JIS Z8901 (1974) obtained on the basis of JIS B9908 (2001)-format 3 test method, such a dust retaining amount that the filter can be used for one year, and a pressure drop of 70 Pa or less cannot be obtained.

As the previous technique of obtaining a low pressure drop filter, there is Patent Document 1 concerning a filtering medium in which an electret sheet having specified performance is laminated on a support medium having bending resistance of 250 mg or more at 65° C. This document describes an idea that a support in which fibers are fixed with a resin having a high glass transition temperature of 35° C. is used so that a filtering medium of a filter unit attached to an automobile left under the scorching sun in the summer is not softened or deformed by heat to increase a structure pressure drop, and an idea that a capturing efficiency is increased by using lamination with an electrification sheet excellent in a quality factor. However, the filtering medium described in this document absolutely is the one preventing a structure pressure drop due to thermal deformation from being increased, but not a filtering medium which prevents a structure pressure drop due to a high air rate from being increased.

Here, in Example 3, a filter unit assembled by subjecting a filtering medium in which an electretted melt blow non-woven fabric is laminated on a net-like support having a lattice interval of 4 mm to pleats processing at a crest height of 38 mm is described, and the effect that a pressure drop of 56 Pa is attained at a filtering air rate of 37 m/min is also described. This could be unitized since the crest height is sufficiently large as compared with the lattice interval of a net; however, there is a problem that when production of a thin-type filter unit having a crest height of around 8 mm, and a crest pitch interval of 3.5 mm, disturbance in the crest pitch interval is easily caused by interference with a lattice interval of a net and, in that case, a structure pressure drop is increased, and an air flow is concentrated only on where it has large pitches. In addition, in an aspect described in this Example, since a support is a net, dust retention is low, and a dust is directly attached to an electretted melt blow non-woven fabric having a more compact structure than that of the net, increase in a pressure drop due to choking is large; therefore, shortening of a life cannot be avoided.

On the other hand, a trial to make a support medium thin and hard to suppress occurrence of a structure pressure drop is shown in Patent Document 2, and application of a paper making method using together with a modified cross-sectional yarn of a rayon fiber and a glass fiber as a fiber constituting a support is disclosed. However, a filtering medium in which a thick glass fiber is mixed has a problem of maintenance and hygiene since a glass fiber is cracked in a pleats processing step and is flown. Further, as seen from Examples, due to the use condition in which a filtering medium passing air rate is extremely slow as 2 m/min, even at a bending resistance of around 158 mg, the filtering medium could be used as a filtering medium causing little occurrence of a structure pressure drop, but for example, under a high air pressure of a filtering medium penetrating air rate of 25 m/min or more, the filtering medium could not stand sufficient use.

In addition, in Patent Document 3, there is the description regarding a HEPA filtering medium which is made by mixing extremely thin glass fibers having a fiber diameter of 0.65 micron. However, a filtering medium using a fiber having such a small fiber diameter causes a high pressure drop due to the material, and cannot be adapted to high air rate filtration at all.

Further, Patent Document 4 and Patent Document 5 disclose that dimensional stability and strength against an air pressure are improved by constructing a filtering medium with a fiber having a high Young's modulus.

Among them, Patent Document 4 relates to a filtering medium for a bag filter using a heat resistant fiber such as polyphenylene sulfide having a Young's modulus of 20 cN/dtex or more. However, this filtering medium has a shape of a woven fabric or a web, and had a remarkably different filtering medium construction in fiber usage, a structure, a weight, a thickness and using utility from a filtering medium having no loose property in which fibers are fixed.

In addition, Patent Document 5 discloses a process for producing a flame-retardant filtering medium in which the medium is produced through a paper making method using a polyvinyl alcohol fiber and a polyester fiber; it describes that, as the characteristic of a paper making method, fibers having different thicknesses and lengths can be used and that a fiber having a high Young's modulus can be also used. However, this document only describes that when the paper making method is used, a fiber having a high Young's modulus can be used, but does not disclose at all a filtering medium having such a stiffness that the medium is less likely to be deformed even under the high air rate filtering while having high air permeability such as air permeability of 100 cm$^3$/cm$^2$·sec or more (further, such as 250 cm$^3$/cm$^2$·sec or more) as well as its fiber construction and fiber physical properties.

Thus, a practical filtering medium containing mainly an organic fiber, which has high air permeability, can stand high air rate filtering, and has little elongation, has been not present.

Patent Document 1: Japanese Patent Application Laid-Open (JP-A) No. 2004-82109
Patent Document 2: JP-A No. 2002-1020
Patent Document 3: JP-A No. 10-180020
Patent Document 4: International Publication WO 0487293
Patent Document 5: JP-A No. 2006-136809
Patent Document 6: JP-A No. 2-61195

SUMMARY OF THE INVENTION

The present invention provides a practical filtering medium which is suitable for high air rate filtering, has high air permeability, has a small thickness, and can be subjected to miniature-pleats processing, and a thin-type filter unit which allows for large amount of air flow to be processed.

The present invention may have any of the following constructions in exemplary embodiments.

(1) A filtering medium having a non-woven fabric containing mainly an organic fiber, in which single fibers are fixed, wherein the non-woven fabric has a specific strength at 1% elongation of 1000 N·cm/g or more and air permeability of 100 cm$^3$/cm$^2$·sec or more.

(2) The filtering medium according to (1), wherein the non-woven fabric is constructed of a plurality of single fibers having different Young's moduli and finenesses, a non-crimped single fiber having a Young's modulus of 150 cN/dtex or more, and a fineness of 7 dtex or more is contained at a ratio of 20% or more of a total fiber mass, and single fibers are fixed with a resin having a glass transition temperature of 30° C. or more.

(3) A filtering medium having a non-woven fabric containing mainly an organic fiber, in which single fibers are fixed, wherein the non-woven fabric is constructed of a plurality of single fibers having different Young's moduli and finenesses, a non-crimped single fiber having a Young's modulus of 150 cN/dtex or more, and a fineness of 7 dtex or more is contained at a ratio of 20% or more of a total fiber mass, and single fibers are fixed with a resin having a glass transition temperature of 30° C. or more.

(4) The filtering medium according to (2) or (3), wherein as a single fiber constituting the non-woven fabric, a non-crimped organic single fiber having a Young's modulus of 200 cN/dtex or more, a fineness of 10 dtex or more, and a fiber length of 8 to 25 mm is contained at a ratio of 10% or more of a total fiber mass.

(5) The filtering medium according to any one of (2) to (4), wherein as a single fiber constituting the non-woven fabric, an organic single fiber having a Young's modulus of 60 cN/dtex or more, and a fineness of 1 to 6 dtex is contained at a ratio of 30% or less of a total fiber mass.

(6) The filtering medium according to any one of (1) to (5), wherein as a single fiber constituting the non-woven fabric, an electrification fiber is contained.

(7) The filtering medium according to any one of (1) to (6), wherein an electrification-processed non-woven fabric is further laminated on the non-woven fabric.

(8) The filtering medium according to any one of (1) to (7), wherein a filtering medium quality factor obtained from permeability of 15 kinds of dusts and a filtering medium initial pressure drop described in JIS Z8901 (1974) obtained on the basis of JIS B9908 (2001)-format 3 test method is 0.4 or more.

(9) A filter unit in which the filtering medium described in any one of (1) to (8) is installed in a frame body, wherein a filtering medium quality factor obtained from permeability of 15 kinds of dusts and a filtering medium initial pressure drop described in JIS Z8901 (1974) obtained on the basis of JIS B9908 (2001)-format 3 test method is 0.03 or more.

(10) The filter unit according to (9), which is for automobile air conditioning.

(11) A process for producing a filtering medium, including dispersing fibers containing at least non-crimped single fiber in a fluid, converting them into a fiber aggregation, and fixing single fibers to obtain the filter medium described in any one of (1) to (8).

Herein, containing mainly an organic fiber refers to that an organic fiber is contained at more than 90%, preferably 95%, relative to a total fiber mass, and an inorganic fiber such as a glass fiber, a ceramic fiber, a carbon fiber and the like is contained only at 10% or less, preferably 5% or less relative to a total fiber mass.

DETAILED DESCRIPTION OF THE INVENTION

According to an embodiment of the present invention, a practical filtering medium which can be thinned, can be subjected to miniature-pleats processing, have high air permeability and can be subjected to processing of large amount of air flow and a filter unit can be provided. That is, since a filtering medium is constructed of a non-woven fabric containing mainly an organic fiber, in which single fibers are fixed, the non-woven fabric is constructed of a plurality of single fibers having different Young's moduli and finenesses and, among them, a non-crimped single fiber having a Young's modulus of 150 cN/dtex or more and a fineness of 7 dtex or more is contained at a ratio of 20% or more of a total fiber mass, and fibers are fixed with a resin having a glass transition temperature of 30° C. or more, a specific strength at 1% elongation can be reached to 1000 N·cm/g or more while air permeability (measured on the basis of the fragile type method of JIS L1096 (1999) with two fabrics piled) of the non-woven fabric is as high as 100 cm$^3$/cm$^2$·sec or higher, thereby, a non-woven fabric of low elongation and a high strength can be obtained. For this reason, even when the non-woven fabric is subjected to miniature-pleats processing, increase in a structure pressure drop can be prevented, and even when a filtering medium is constructed of a material having high air permeability, thinning for processing large amount of air flow becomes possible. As a result, miniaturization of a filter unit and an accommodating equipment becomes possible. In addition, since a pressure drop is reduced, a wind noise generated by friction between the filtering medium and the air becomes small and so this can make a contribution to a low noise property. Further, since the air can be fed with a low output blast fan of a small consumed power, embodiments of the present invention can also make a contribution to energy saving.

The filtering medium of an embodiment of the present invention is characterized by having a non-woven fabric containing mainly an organic fiber, in which single fibers are fixed, a specific strength at 1% elongation of the non-woven fabric is 1000 N·cm/g or more, and air permeability measured on the basis of the fragile type method of JIS L1096 (1999) with two fabrics piled is 100 cm$^3$/cm$^2$·sec or more. The non-woven fabric constituting the filtering medium is constructed using a plurality of single fibers having different Young's moduli and finenesses as a single fiber constituting the non-woven fabric, and among them, a non-crimped single fiber having a Young's modulus of 150 cN/dtex or more, a fineness of 7 dtex or more contained at a ratio of 20% or more of a total fiber mass, and fibers are fixed with a resin having a glass transition temperature of 30° C. or more, thereby, the non-woven fabric is obtained.

Herein, properties desired for a filtering medium used in a filter unit for household air cleaner, air conditioning of buildings/factories, and air conditioning facility mounted in automobiles are a low pressure drop property for processing large amount of air flow, and a low elongation and high strength property by which a structure pressure drop is not generated, and is not deformed with wind loading even when being thin. Further, a high dust capturing capability as well as a filtering medium structure which is less likely to be choked and which retains voids amounts are also desired. Here, a structure pressure drop referred in the present invention refers to a numerical value obtained by subtracting a pressure drop caused by a material of the filtering medium from a pressure drop (unit pressure drop) generated when the air is flown through a filter unit accommodating pleats-processed filtering medium.

The means which has previously been adopted for reducing an unit pressure drop is for reduction in a pressure drop caused by the material of the filtering medium. For this reason, generally, reduction in an amount of a fiber of the filtering medium and reduction in a fiber density by increasing a fineness and bulkiness have been performed. However, in this method, although the pressure drop of the material itself of the filtering medium is reduced, a force fixing between fibers of the filtering medium is weakened, elongation occurs in the filtering medium, and so the structure pressure drop is conversely increased. In the filtering medium in which an electrification-processed sheet is further laminated for increasing capturing performance, since wind loading is further increased, the structure pressure drop is increased, and lowering pressure drop is more difficult.

However, according to an embodiment of the present invention, even when non-woven fabric constituting the filtering medium has an extremely coarse structure of such a low weight that air permeability (measured on the basis of the fragile type method of JIS L1096 (1999) with two fabrics piled) of 100 cm$^3$/cm$^2$·sec or more is obtained, it becomes to have a low elongation and high strength property such as a specific strength at 1% elongation of 1000 N·cm/g or more; as a result, even when miniature-pleats processing at a narrow pleats interval is performed, occurrence of the structure pressure drop is small, and the filtering medium is thinned, allowing for large amount of air flow to be processed.

Previously, as an index for expressing a hardness of the filtering medium, bending resistance defined in JIS L1085 (1977) B Method has been widely used; but since the bending resistance is an index having no relationship with a thickness, a weight and air permeability of the filtering medium, there are a number of filtering media showing the same bending resistance value even in the case of filtering medium constructions having a different filtering medium thickness, a different filtering medium weight, and different filtering medium air permeability. However, even in the case of filtering media showing the same bending resistance, when a thickness and air permeability are different, there is a difference in pressure drop performance in a filter unit accommodating the filtering medium. That is, since an occurrence degree of a structure pressure drop is different, the difference in pressure drop performance occurs. Thus, the bending resistance which has been previously used as an index expressing a hardness of the filtering medium can be used to relatively compare filtering media in which filtering medium construction conditions do not depend on plural variables, but is unsuitable as an index for measuring an occurrence degree of a structure pressure drop influencing on unit pressure drop construction.

Then, the present inventors studied a new index for comparing properties by which a low pressure drop filter having a small degree of structure pressure drop occurrence can be made and, as a result, found out that, in a high air permeability non-woven fabric having air permeability measured on the basis of the fragile type method of JIS L1096 (1999) with two fabrics piled, of 100 cm$^3$/cm$^2$·sec or more, a specific strength manifested when the non-woven fabric of a width of 5 cm is elongated by 1% (tensile strength [N/cm$^2$]/apparent density of the non-woven fabric [g/cm$^3$]) is important even when a thickness, a weight and a production process of the non-woven fabric are different.

Detailed construction of the filtering medium in embodiments of the present invention will be described below.

Occurrence of a structure pressure drop of a filter unit accommodating pleats-processed filtering medium is generated by elongation and deformation of the filtering medium with wind loading applied to the filtering medium when the air is passed through the filtering medium, to narrow an air flow path interval held between adjacent pleats filtering media, and contact filtering media to make flow of the air difficult. For this reason, a thickness of the filtering medium becomes one factor of occurrence of a structure pressure drop.

Ideal increase relationship between a filtering air rate and a pressure drop is that the pressure drop is increased approximately in proportion with the air rate; however, in the filtering medium causing a structure pressure drop, since the pressure drop corresponding to deformation from the filtering medium shape is added to a pressure drop caused by the filtering medium itself, the pressure drop is increased curvely. For this reason, high air rate filtering is difficult.

On the other hand, reduction in a structure pressure drop requires a thin filtering medium which shows small filtering medium elongation as well as low elongation and high strength, and rigidity is in proportion with cubic of a thickness. For this reason, low elongation and high strength is not attained with a thin filtering medium of a small weight, such as air permeability as measured on the basis of the fragile type method of JIS L1096 (1999) with two fabrics piled, of 100 cm$^3$/cm$^2$·sec or more.

However, making of a thin filtering medium causing a small structure pressure drop has been intensively studied; as a result, it has been found out that, by constructing a non-woven fabric constituting the filtering medium of a plurality of single fibers having different Young's moduli and finenesses, by among them, inclusion of a non-crimped single fiber having a Young's modulus of 150 cN/dtex or more and a fineness of 7 dtex or more in a range of at least 20% or more of a total fiber mass and, further, fixing fibers with a resin having a glass transition temperature of 30° C. or more, a low elongation and high strength non-woven fabric which shows low pressure drop and is excellent in the dust retaining ability even when being thin and high in air permeability, that is, a non-woven fabric having a specific strength of 1000 N/cm/g or more is obtained.

Further, in an embodiment of the present invention, the non-woven fabric constituting the filtering medium has a specific strength of 1000 N·cm/g or more, more preferably 1500 N·cm/g or more, further preferably 2000 N·cm/g or more, and most preferably 2500 N·cm/g or more. A high specific strength indicates a low elongation and high strength filtering medium even when air permeability is high. Since the non-woven fabric constituting the filtering medium shows low elongation and high strength even at high air permeability, shape deformation generated by application of wind loading can be suppressed even the non-woven fabric is pleats-processed, and occurrence of a structure pressure drop can be reduced, allowing for large amount of air flow to be processed with low pressure drop.

On the other hand, an upper limit is preferably less than 8000 N·cm/g since at such a specific strength that tensile elongation at breakage defined by JIS L1085 (1998) becomes 1.0% or less, that is, 8000 N·cm/g or more, breakage of the filtering medium occurs at a crest root at which the filtering medium is pleats-processed.

Then, physical properties of a fiber used in exemplary embodiments will be described.

In order to attain low elongation and high strength of the filtering medium in exemplary embodiments of the present invention, the non-woven fabric is constructed of a plurality of single fibers having different Young's moduli and finenesses, and a non-crimped single fiber having a Young's modulus of 150 cN/dtex or more and a fineness of 7 dtex or more is contained at a ratio of at least 20% or more of a total fiber mass.

The preferable Young's modulus of a single fiber is 200 cN/dtex or more, more preferably 250 cN/dtex or more, further preferably 300 cN/dtex or more. On the other hand, an upper limit is preferably 3000 cN/dtex or less. The reason is as follows: when a single fiber having a Young's modulus of more than 3000 cN/dtex is used, specifically when an aramide fiber (4400 cN/dtex or more), ultrahigh molecular weight polyethylene (8000 cN/dtex or more), a glass fiber (326000 cN/dtex or more), or the like is used, tensile elongation at breakage of the non-woven fabric becomes 1.0% or less and a specific strength becomes 1000 N·cm/g or more, depending on amount used and a fineness; however, adverse influence such as reduction in a tearing strength, occurrence of breakage of the non-woven fabric due to intolerance to bending elongation at a pleats-processed crest part, fine split, and sticking into a skin is caused; therefore, it is not preferable to use a fiber of more than 3000 cN/dtex.

Based on the above reason, a suitable Young's modulus range of a single fiber used is 150 to 3000 cN/dtex, more preferably 200 to 2000 cN/dtex, further preferably 250 to 1500 cN/dtex, most preferably 300 to 1000 cN/dtex. By selecting this range, a filtering medium is obtained, in which breakage of a non-woven fabric and reduction in a tearing strength are small, and deformation of the filtering medium with wind loading is small.

Furthermore, in an embodiment of the present invention, it is preferable that the aforementioned fiber is non-crimped single fiber. In the case of non-crimped single fiber, since fiber aggregation in the non-woven fabric becomes planar, orientation of each single fiber is one-dimensional, and the no loose state is attained. For this reason, since when an external force is applied to the non-woven fabric, elongation accompanied with a loose property is small, this is suitable in that a tensile resistance force depending on physical properties of single fiber is immediately generated easily.

In addition, a specific strength is an index concerning a strength at 1% elongation when the non-woven fabric is pulled in one direction, but since deformation of the non-woven fabric is generated by bending with wind loading, increase in bending resistance in addition to specific strength administration is extremely important. Bending resistance can be increased by increasing a thickness of the non-woven fabric and a weight of the non-woven fabric, but that increases ventilation resistance, narrows an air flowing interval, and conversely becomes a factor of a pressure drop increase; therefore, a thickness cannot be increased. Then, in order to increase bending resistance with a thin non-woven fabric, it is effective to form a skeleton of the non-woven fabric using a thick single fiber having a fineness of 7 dtex (fiber diameter 26 µm) or more at 20% or more of a total fiber mass. Here, in the present specification, a fiber diameter denoted beside a fineness is a fiber diameter letting a specific gravity of a fiber material to be 1.30 g/cm$^3$.

Since a skeleton also has the purpose of forming a space for retaining a coarse dust, a single fiber which is thick so that it is not easily to be bent and which has a high Young's modulus is suitable. For this purpose, as a preferable single fiber of a skeleton-constituting fiber, a fiber having a Young's modulus of 150 cN/dtex or more and a fineness of 7 dtex (fiber diameter: 26 µm) or more is suitable. On the other hand, since when the fiber is too thick, it sticks a skin, a preferable fineness is in a range of 7 to 40 dtex (fiber diameter 26 to 63 µm), and a further optimal single fiber fineness is 10 to 40 dtex (fiber diameter 30 to 59 µm).

Further, when a blending ratio of a single fiber of such a Young's modulus and fineness is less than 20%, a fiber density becomes compact, and the property of air permeability of 100 cm$^3$/cm$^2$·sec or more is not obtained. Therefore, it is necessary that a single fiber of such a Young's modulus and fineness is contained at a ratio of 20% or more of a total fiber mass. On the other hand, when a blending rate is more than 80%, air permeability can be maintained, but a force of connecting and fixing fibers is reduced, and a specific strength is easily reduced. For this reason, a preferable range is 80% or less, more preferably 25 to 80%, further preferably 30 to 60%. On the other hand, since a thick fiber which is to be a skeleton has a low capturing efficiency, it is better that a thin fiber having a fineness of 1 to 6 dtex (fiber diameter 10 to 24 µm) is also blended, and performance of capturing a fine particle to a coarse particle is maintained, and a dust retaining amount is controlled.

Then, a fiber length will be described. When a fiber length of a single fiber which is to be a skeleton is short, a sufficient tensile strength is not obtained even though fibers are fixed with a resin. A length of a fiber which has previously been used in a paper making method was around a few mm to 10 mm. The reason is that entanglement of fibers is reduced to obtain uniformity of a fiber weight and that is the characteristic of a paper making method. However, even when short fibers having a Young's modulus of 150 cN/dtex or more and a fineness of 7 dtex (fiber diameter 26 µm) or more, which is thick and is difficult to be bent, are fixed with a hard resin having small elongation, a tensile strength is not increased since contact points between fibers are small, and it is difficult to enhance a specific strength. For this reason, in an embodiment of the present invention, it is preferable that a fiber length is 8 to 25 mm. Particularly, when a thick fiber having a Young's modulus of 200 cN/dtex or more and a single fiber fineness of more than 10 dtex (fiber diameter 31 µm) is used, it is preferable that a fiber length is 8 to 25 mm, preferably 13 to 20 mm, and a content of the fiber is 100 or more, preferably 30% or more. Thus, a specific strength can be further enhanced. Here, in the case of 25 mm or more, variation of a weight easily becomes great.

Further, in exemplary embodiments of the present invention, in order to increase a specific strength, it is preferable to use a thin single fiber having a high Young's modulus and a thick single fiber having a high Young's modulus by mixing them. In the case of an embodiment of the present invention, since a non-crimped fiber is used, unlike the case where a web is made using a crimped fiber, fixation of fibers is performed only at contact points between fibers by adhesion with a fixation resin. However, when a stiff short fiber, for example, a thick fiber more than 10 dtex having a fiber length of around 5 to 12 mm is used in order to enhance a specific strength, contact points between fibers at which fibers are contacted are small since a fiber surface area is small, and the number of connecting points is extremely small as compared with a thin fiber. In addition, since the fiber is stiff, fibers are hardly entangled. As this result, even when a non-woven fabric is constructed using only a thick fiber having high bending stiffness, contact points are easily slipped, physical properties of a fiber cannot be sufficiently utilized, and it is difficult to sufficiently increase a specific strength in some cases. As strategy for this, it is preferable to use thin single fibers of 1 to 6 dtex (fiber diameter 10 to 24 µm) having a Young's modulus of 60 cN/dtex or more, preferably 90 cN/dtex or more, further preferably 150 cN/dtex or more, most preferably 200 cN/dtex or more by mixing them. By adopting that, the number of fibers is increased, places of contacting with a thick fiber can be increased, and moreover, a part of fibers are entangled so as to converge a thick fiber. Since a fixation resin is intensively attached to contact points or entanglement places, the fixation resin is effectively utilized, a force of fixing fibers is enhanced, a specific strength can be increased. In addition, a thin fiber can simultaneously exert the function as a fiber of enhancing a dust capturing capability. It is preferable that a blending rate of a thin single fiber of 1 to 6 dtex is 30% or less, more preferably 25% or less, relative to a total fiber mass for obtaining high air permeability. However, depending on amount of the thin single fiber used, the dust capturing capability is enhanced, choking is easily caused, as a result, becoming a cause for reduction in a life. In addition, this can be also a cause for reduction in air permeability. Therefore, 10% or more is more preferable, and 15% or more is further preferable.

Further, it is also preferable that the non-woven fabric in an embodiment of the present invention is produced using two or more fiber groups having the same single fiber fineness and different fiber lengths. When a fiber length is short, a fiber stands due to its stiffness in the non-woven fabric, and there is a tendency that the non-woven fabric is bulky, that is, a fiber density is reduced. On the other hand, when a fiber length is long, a fiber lies down, and there is a tendency that a non-woven fabric is thin, that is, a fiber density becomes high. By combining two or more fiber groups having different fiber lengths, a fiber density of the filtering medium can be regulated with a high flexibility.

Furthermore, in an embodiment of the present invention, it is preferable that air permeability of the non-woven fabric is high for processing large amount of air flow and air permeability of the non-woven fabric is 100 $cm^3/cm^2 \cdot sec$ or more. A numerical value of air permeability of the present invention is a numerical value measured on the basis of the fragile type method of JIS L1096 (1999) with two non-woven fabrics piled.

In the case of the non-woven fabric with small amount of voids having an air permeability of less than 100 $cm^3/cm^2 \cdot sec$, when used at a filtering medium penetrating air rate of 25 m/min, a life is shortened since the fabric is choked in the state where an addition amount of 15 kinds of JIS dusts is small. For example, in order to attain a life of two years for automobile air conditioning, it is necessary to trap the dust at about 10 g or more/unit, but this cannot be obtained. On the other hand, when dust permeability is more than 700 $cm^3/cm^2 \cdot sec$, dust capturing performance is reduced, and a capturing rate of 85% or more is hardly obtained; an upper limit is 700 $cm^3/cm^2 \cdot sec$. A suitable range of air permeability is 100 to 600 $cm^3/cm^2 \cdot sec$, more suitably 120 to 500 $cm^3/cm^2 \cdot sec$.

Such a non-woven fabric preferably has a weight range of 20 to 70 $g/m^2$, and a thickness range of 0.2 to 0.55 mm. That is to reduce a structure pressure drop ratio more and to obtain a low pressure drop filter.

In addition, an apparent density in the non-woven fabric is preferably 0.08 $g/cm^3$ or more, more preferably 0.09 $g/cm^3$ or more. When the apparent density is less than 0.08 $g/cm^3$, strength of fixing fibers is reduced, elongation of a filtering medium is caused, and so a specific strength is easily reduced. On the other hand, when the apparent density is too great, air permeability is decreased; also, an amount of a space which can retain a dust is decreased, and so filtering medium is easily choked and become a short life. Therefore, the apparent density is preferably 0.18 $g/cm^3$ or less, more preferably 0.15 $g/cm^3$ or less, further preferably 0.13 $g/cm^3$ or less.

A thickness of the non-woven fabric is preferably 0.55 mm or less, more preferably 0.50 mm or less, further preferably 0.45 mm or less, further preferably 0.40 mm or less. By adopting the thickness of 0.55 mm or less, a structure pressure drop can be suppressed low. On the other hand, when the non-woven fabric is too thin, an amount of a space which can retain a dust is reduced, and a life is shortened; therefore, 0.2 mm or more is preferable.

As a process for producing the non-woven fabric, a wet paper making method, an air laid method, a dry chemical bonding method, a thermal bonding method, and a spun bond method can be exemplified. The wet paper making method, and the air laid method are methods of integrating non-crimped short fibers having a short fiber length of a few mm to 10 mm to obtain a non-woven fabric, and the dry chemical bonding method is a method of webbing a crimped short fiber by passing through a carding machine, thereafter, impregnating the web with an emulsified resin, drying this to fix fibers to make a non-woven fabric. In addition, the thermal bonding method is a method of webbing a short fiber containing a crimped thermal adhesive short fiber by passing through a carding machine, thereafter, thermally fusing the fibers to make a non-woven fabric, and the spun bond method is a method of pulling a polymer out from a small pore in the melt state, and solidifying it to directly convert into a non-woven fabric.

Among the aforementioned processes, in order to attain a specific strength, the wet paper making method and the air laid method are most preferable. The reason why the wet paper making method and the air laid method are optimal methods attaining a specific strength will be described below in more detail.

The non-woven fabric of the chemical bonding method or the thermal bonding method essentially using a crimped short fiber is obtained by passing the fiber through a carding machine to obtain a fiber web, and fixing fibers by resin processing or thermal adhesion. The non-woven fabric structure is such that a single fiber used is originally provided with three-dimensional crimping; therefore, even when fibers are fixed with a resin, the non-woven fabric easily becomes thick, and a loose property in the three-dimensional state easily remains. As this result, when an external force is applied, fiber entanglement is released from at a part where a loose property remains, and elongation of filtering medium made of non-woven fabric precedes deformation resistance strength; therefore, a structure pressure drop is easily caused.

On the other hand, in the wet paper making method non-woven fabric or air laid method in which a non-crimped short fiber having a fiber length of a few mm to a few tens mm is dispersed in a fluid such as water and the air to accumulate on a screen, since fiber accumulation is planar, orientation of each single fiber is one-dimensional, and fibers are in no loose state. As the result, in a filtering medium in which single fibers of this fiber aggregation are fixed, when an external force is applied, elongation due to the loose property is small; therefore, a tensile resistance force depending on single fiber physical properties is immediately generated easily.

From the above reasons, in an embodiment of the present invention, it is preferable that a fiber aggregation is produced by the wet paper making method or the air laid method, thereafter, single fibers are fixed to produce a non-woven fabric. Inter alia, in the wet paper making method, there are a circular knitting method and a slant wire method. Since the slant wire method scoops water wherein fibers are dispersed with a net to aggregate fibers on a net plane, impregnates this with a binder, and dried, it is possible to make a paper even with a wide and long short fiber having a fiber length of more than 10 mm. For this reason, the non-woven fabric having a high specific strength is easily obtained, and so the method is an optimal production method. On the other hand, in the circular knitting method, since a fiber and a binder or a particle-like additive are aggregated and an aggregation is scooped from the solution, the aggregation is not scooped into a curved surface-shaped scooping surface when a fiber length is large. Therefore, in the circular knitting method, it is preferable that a fiber length is short as being around 5 mm. In this case, it becomes difficult to increase a specific strength.

In addition, the wet paper making method and the air laid method are preferable methods in that the non-woven fabric can be produced by arbitrarily mixing a plurality of a fiber groups having different fiber properties. In addition, in the case of producing the filtering medium through the air laid method or the wet paper making method, the filtering medium having a high specific strength and of which flame retardancy is enhanced can be obtained by using a flame-retardant fiber in which a flame-retardant agent is kneaded into a thermal adhesive fiber being a composite of a low melting point fiber and a high melting point fiber or a fiber composed of a normal homopolymer. Further, when a hindered amine-based additive effective in electrification processing is simultaneously kneaded, a flame retardant filtering medium which is excellent in an electret property and is high in a specific strength can be obtained.

As the fiber constituting the non-woven fabric, fibers such as a polyester fiber, a polyamide fiber, a polyvinyl alcohol fiber, a ultrahigh-molecular weight polyethylene fiber, a polypropylene fiber, a polyaramide fiber, an inorganic fiber, and a carbon fiber can be used. However, the inorganic fiber such as glass, and the carbon fiber, having a high Young's modulus show elongation at breakage of a single fiber as small as 4% or less, and the fiber is very easily broken, being not preferable. In addition, since the polyaramide fiber is easily fibrillated in the paper making step, the Young's modulus is less likely to be increased, and ventilation resistance is tend to be uneven, being not preferable. The ultrahigh molecular weight polyethylene fiber is not preferable since melting and thermal shrinkage of the fiber are generated by heating at a high temperature of 150° C. or more in the drying heat-processing step when a fiber aggregation is impregnated with a resin having a high glass transition point described later to make fiber fixation firm. Among these fibers, particularly, a polyvinyl alcohol fiber is optimal.

As the polyvinyl alcohol fiber, there are a polyvinyl alcohol fiber produced by an aqueous wet spinning method which has been performed from old time, and a polyvinyl alcohol fiber of a high Young's modulus, which is produced by a solvent wet cooling gel spinning method developed newly. Among them, the polyvinyl alcohol fiber produced by the solvent wet cooling gel spinning method is an optimal fiber as a single fiber constituting the non-woven fabric. That is due to the fact that fiber breakage is less likely to be happened even in pleats processing since it has a higher Young's modulus than that of the polyvinyl alcohol fiber produced by the aqueous wet spinning method which has previously been used and has high elongation at breakage of 4 to 15% than that of the inorganic fiber, that a dry heat shrinkage rate is as small as 1.2% or less, dimensional change of the non-woven fabric in drying heat-processing upon fiber fixation of a fiber aggregation is small and, and that water absorption is low, the fiber is less likely to be influenced by the wet air, dimensional change of the filtering medium is small, and it is a fiber by which flame retardancy is easily obtained.

In addition, when a polyolefin-based fiber such as polypropylene is used, the fiber can be made to be an electrified fiber by electret processing through a corona discharge method or a hydrocharge method after an oil or an ionic adhesion substance on a fiber surface is washed. Then, the filtering medium having a high capturing capability can be obtained. Particularly, use of a polypropylene fiber or a modified polypropylene fiber in which polypropylene and polyethylene are copolymerized, having a Young's modulus of 100 cN/dtex or more and subjected to an electret processing, is further preferable for making an electret filtering medium of high stiffness.

In an embodiment of the present invention, the non-woven fabric can contain a flame-retardant. Examples of the flame-retardant include halogen-based flame-retardants such as bromine-based flame-retardant and chlorine-based flame-retardants, phosphorus-based flame-retardants, guanidine-based flame-retardants, melamine phosphorate-based flame-retardants, and inorganic based flame-retardants. Among them, a non-halogen-based flame-retardant and a bromine-based flame-retardant satisfying RoHS Regulation are preferable in the view of the fact that a harmful substance is not generated at incineration.

Further, among the non-halogen-based flame-retardant, a sulfamine-based flame-retardant, phosphorus-based flame-retardants such as a phosphate ester, ammonium phosphate, guanidine phosphate, melamine phosphate, and cyclic phosphazene, and melamine sulfate have the high effect of promoting carbonization when a polyvinyl alcohol component and a cellulose component of vinylon and pulp are burnt. In addition, those flame-retardants have the high effect of preventing carbonization and preventing fire spreading at burning of a polyester fiber even when such a type of a fiber that it is melted is mixed.

The flame-retardant may be water-soluble, and the flame-retardant which becomes particle-like at a normal temperature is optimal since it does not reduce a specific strength when incorporated.

In addition, in an embodiment of the present invention, the non-woven fabric may have an additional function by imparting a water-repellent, a perfume, a deodorizing agent, an antibacterial agent, an anti-virus agent, an anti-allergen agent, a gas adsorbing agent, a gas adsorbing porous body or the like.

Further, in an embodiment of the present invention, single fibers of the resulting non-woven fabric are fixed with a resin having a glass transition temperature of 30° C. or more. As a method, a method of collecting a fiber dispersed in a fluid such as water and the air with a net to obtain a fiber aggregation, and incorporating a resin into the aggregate, followed by drying fixation, that is, a method of incorporating a resin having a glass transition temperature Tg of 30° C. or more, preferably 35° C. or more, more preferably 40° C. or more, further preferably 50° C. or more into a fiber aggregation, and performing drying/heat-processing to fix the fibers can be exemplified. When a glass transition temperature Tg is higher than 80° C., a disorder such that a film is not sufficiently made by drying at around 110° C. and then a crack is generated, and a film is broken when wind loading is applied in the state where it is exposed under the atmosphere of −40° C. is easily caused; therefore, a preferable range of Tg is a range of 30 to 80° C.

When a resin having relatively high Tg is used, as Tg is increased, a resin becomes harder, tensile elongation of the non-woven fabric is reduced, approaching tensile elongation of a single fiber used. For this reason, when the non-woven fabric in which fibers are fixed is pulled, a stress is simultaneously applied to both of the resin and the fiber, and a tensile strength corresponding to a Young's modulus of the fiber used occurs. For this reason, the non-woven fabric having a high specific strength is easily obtained. In addition, even when a filter unit is used in the atmosphere of a high temperature, since softening of the resin is small, reduction in a specific strength of the non-woven fabric is small, and the effect such that a pressure drop change is less likely occurred is obtained.

As a resin which can exert such an effect, for example, an acrylic acid ester resin, a styrene-acryl resin, an epoxy resin, and the like can be suitably used. Among them, the styrene-acryl resin having high stiffness and good adherability with a fiber is suitable since it increase fiber fixing force. Such a resin may be imparted by formulating it into an aqueous solution and immersing a fiber aggregation in the aqueous solution, or spraying the aqueous solution to the fiber aggregation; single fibers as described above can be also fixed by mixing the resin in a form of a thermal adhesive fiber at preparation of a fiber aggregation and by melting such a fiber.

Further, in an embodiment of the present invention, it is preferable that a particle-like substance having an average particle diameter of 100 μm or less is mixed into a resin for fixing fibers. Even though the non-woven fabric in which fibers are fixed without mixing the particle-like substance into a resin can attain a specific strength of 1000 N·cm/g or more, a higher specific strength can be obtained by mixing it. In the non-woven fabric in which single fibers are fixed by the resin including the particle-like substance having an average particle diameter of 100 μm or less, the particle-like substance exert the effect of suppressing elongation of a resin itself to suppress elongation of a whole non-woven fabric. Then, strength at breakage of the non-woven fabric is reduced even though elongation is reduced, and a filtering medium which is less likely to be deformed is obtained.

When a particle diameter of the particle-like substance is too small, the effect of interrupting continuity of a binder becomes too high, and reduction in strength becomes great. On the other hand, when a particle diameter is too large, a space between fibers is choked and pressure drop is increased, being not preferable. For this reason, a particle diameter is preferably 5 to 100 μm, more preferably 10 to 30 μm, further preferably 12 to 25 μm. These may be contained at 0.5 to 20% by mass, preferably 5 to 10% relative to a total mass of the filtering medium.

As such a particle-like substance, a substance can attain the object as far as it shows a solid shape at a normal temperature, and specifically calcium carbonate, titanium oxide, aluminum hydroxide, magnesium hydroxide, a silicon compound, a bromine-based flame-retardant, melamine phosphate and the like can be exemplified.

In an embodiment of the present invention, in order to improve a dust capturing capability in high air flow filtration, the aforementioned non-woven fabric may be subjected to electrification processing, or another electrification-processed non-woven fabric may be laminated on the aforementioned non-woven fabric.

As the electrification-processed non-woven fabric, the non-woven fabric having a quality factor of 0.15 or more is preferable in order to obtain a low pressure drop and high capturing property by rendering a capturing rate of 15 kinds of JIS dusts 85% or more even by high air rate filtration at a filtering medium penetration air rate of 25 m/min or more. As a process for producing such a high performance electrification-processed non-woven fabric, a friction electrification processing method, a hydro-charge method, and a corona discharge method are known, and any process can be implemented. In the non-woven fabric by the friction electrification processing method, since electrification processing is performed by friction-processing a fiber aggregation in which a polypropylene fiber and a polyester fiber, or a polypropylene fiber and a poly acrylic fiber are mixed, among fibers, the non-woven fabric has a structure in which a fiber density is low, and the fabric is less likely to be choked. For this reason, the fabric is suitable in a filtering medium required particularly a long life. In addition, since the hydro-charge method can perform electrification processing even on a low weight non-woven fabric, it has the excellent characteristic that a thickness of a filtering medium can be reduced.

In addition, it is preferable that the filtering medium in an embodiment of the present invention has a quality factor of 0.4 or more. The filtering medium quality factor is obtained by setting a filtering medium in an assessment instrument according to JIS B9908 (2001)-format 3 test method, flowing the air at a filtering medium penetration air rate of 4.5 m/min, supplying 15 kinds of dusts described in JIS Z8901 (1974) until pressure drop approaches a final pressure drop of an initial pressure drop+150 Pa, and dividing natural logarithm of dust permeability obtained from a ratio of a total dust supplying amount and an amount of a dust which was not captured with the filtering medium, and passed, by the pressure drop before dust loading of the filtering medium. A higher filtering medium quality factor indicates a high dust capturing rate in spite of a low pressure drop. In a filtering medium having the filtering medium quality factor of less than 0.4, since a rate of capturing a pollen or the like becomes 85% or less, the effect of preventing sideration of allergy symptom is low. The quality factor of preferably 0.5 or more, further preferably 1.0 or more is optimal since from a fine dust to a coarse particle such as a pollen can be captured in spite of a low pressure drop.

Further, in an embodiment of the present invention, it is preferable that a unit quality factor of a filter unit using the aforementioned filtering medium is 0.03 or more. The unit quality factor is obtained by setting a filter unit using the filtering medium in an assessment instrument according to JIS B9908 (2001)-format 3 test method, flowing the air at a flow rate of 525 m³/hr, supplying 15 kinds of dusts described in JIS Z8901 (1974) until from an initial pressure drop to attainment of a final pressure drop of 200 Pa, and dividing natural logarithm of dust permeability obtained from a ratio of a total dust supply amount and an amount of a dust which has been not captured by the filter unit and passed, by a pressure drop before dust loading of the filter unit. A higher unit quality factor indicates a high dust capturing rate in spite of a low pressure drop. A filter unit having the unit quality factor of less than 0.03 is not good because a capturing rate of a pollen or the like becomes 85% or less and the effect of preventing sideration of allergy symptom is low. The filter unit having the unit quality factor of more preferably 0.05 or more, further preferably 0.06 or more, is optimal since from a fine dust to a coarse particle such as a pollen can be captured in spite of a low pressure drop.

In order to increase the unit quality factor, it is important to reduce an initial pressure drop of the filter unit. The unit pressure drop is composed of a sum of a filtering medium pressure drop and a structure pressure drop. Among them, the structure pressure drop varies depending on a choking degree of an interval of an air flow path formed by pleats-processed filtering medium caused by the deformation of filtering medium due to an air pressure. When a unit of a high crest and a unit of a low crest having the same filtering medium area and the same pitch between crests are made with the same filtering medium, the same air pressure is applied to them as calculation since an air rate passing through the filtering medium is the same. However, in the unit of a high crest, since an amount of deformation of the filtering medium generated on a slant surface of a crest becomes greater than that of the unit of a low crest, a structure pressure drop is increased. For this reason, in order to increase the unit quality factor, it is advantageous to make breadth of a filter large and to make a unit shape thin-type.

In addition, in order to increase the unit quality factor, it is important that dust permeability at a final pressure drop is reduced. The dust permeability at a final pressure drop is determined by a fiber construction, a fiber density, initial capture performance and a filtration air rate of the filtering medium. Since the dust permeability is reduced by choking due to dust adhesion, a higher fiber density is an advantageous, but in such a case, an initial pressure drop is increased, and a life is shortened, being not suitable. As an optimal method, a method of laminating an electrification-processed non-woven fabric having an electrification-processed non-woven fabric quality factor of 0.12 or more, an average single fiber diameter of 4 μm or more, and a fiber density of 0.12 g/cm³ or less on another filtering medium is optimal. That is, by increasing a capturing efficiency with a bulky electrification-processed non-woven fabric having an initial dust permeability of 20% or less, a low pressure drop air filter unit which has high capturing performance even at large air flow processing and which has a long life can be obtained.

EXAMPLES

Embodiments of the present invention will be described more specifically below using Examples. First, a method of assessing each property of the filtering medium in the present Examples is described below. As a test piece used in assessing a Young's modulus, a thickness, a weight, and a specific strength, a test piece having humidity adjusted according to standard temperature humidity state class 2 of JIS Z8703 (1983) (temperature 20±2° C., relative humidity 65±2%) is used.

<Fineness, Fiber Length and Construction Ratio of Single Fiber>

A non-woven fabric constructed of a single fiber and a resin is immersed in a solution in which the resin is dissolved, to remove a resin, leaving only the fiber, a fiber length is measured with a caliper, and single fibers are classified depending on each length. For every group having a different fiber length, a fiber width is measured with an electron microscope, followed by classification. Thereupon, the number of at least 100 or more of fibers is measured, and constructions of single fibers are classified for every group. Then, the construction fiber is placed in a density gradient solution made by mixing carbon tetrachloride and water, and a solution density at which the fiber is not floated and not sunk is obtained, which is defined as a fiber density. Here, when the fiber is dissolved in the density gradient solution, an appropriate organic solvent having a great specific gravity in which the fiber is not dissolved is selected. When the fiber is floated, a melting point is measured, and a material is specified from the melting point. A fineness of the single fiber is obtained by obtaining a cross-sectional area A [cm²] letting the obtained fiber width of a single fiber to be a fiber diameter, multiplying a fiber specific gravity B [g/cm³] of this short fiber, and performing the following equation.

Fineness [dtex]=$A$[cm²]$\times B$[g/cm³]$\times 10^6$

Then, regarding a constitution ratio of the single fiber, the construction ratio of each group of the single fiber obtained previously is converted into a fineness and a fiber length, and a ratio occupied in a total fiber mass is calculated.

<Young's Modulus>

A Young's modulus is assessed according to JIS L1013 (1999). An apparent Young's modulus is obtained from an initial tensile resistance degree, and this numerical value is defined as Young's modulus. In addition, since a fiber length is short as being a few mm to a few tens mm, a tensile rate for one minute is set to be 100% of the fiber length. The assessment number N is at least 10 or more, and an arithmetic average is adopted as a Young's modulus of the present invention.

<Air Permeability>

Measurement was implemented according to the assessment method of the fragile type method described in JIS L1096 (1999). However, when one non-woven fabric is measured, measurement result easily varies, and so measurement is performed with two fabrics piled. In addition, the assessment number N is at least 5 or more, and an arithmetic average is adopted as air permeability of the present invention.

<Measurement of Average Particle Diameter of Particle Substance>

When a particle is an inorganic substance, a resin is dissolved in a solvent, remaining particles are observed with a microscope, and a primary particle diameter is measured. When the particle is an organic substance, a surface of a filtering medium is observed with SEM, 50 or more particles are randomly selected, a long diameter is measured, and an arithmetic average of the long diameter is adopted as an average particle diameter of the particle-like substance. Here, when only a resin can be dissolved, the resin is dissolved and, thereafter, filtration is performed, and remaining particles are observed with a microscope.

<Thickness>

A thickness at a measurement frequency of three places per 100 cm², a total of 21 places is obtained using SM114 manufactured by Teclock Corporation, and its arithmetic average is utilized.

<Weight>

A mass of an assessment sample (non-woven fabric, electrification-processed non-woven fabric or filtering medium) is obtained, is converted into a mass per m² from its area, and is obtained as a weight of each assessment sample. A sampling minimum area is 0.01 m² or more.

<Specific Strength>

A tensile strength is obtained according to JIS L1085 (1998), and a specific strength is obtained from the tensile strength. Specifically, first, a non-woven fabric having a width of 50 mm is assessed with a constant rate tensile tester (Model AGS-J manufactured by Autograph SHIMADZU) at a length between chucks of 200 mm and a tensile rate of 100 mm/min to obtain a S-S curve, tenacity [N] generated at 1% elongation is obtained from the curve, the generated tenacity is divided by a cross-sectional area (non-woven fabric width 50 mm×non-woven fabric thickness) of a test piece, thereby, a tensile strength [N/cm$^2$] at 1% elongation is obtained. Subsequently, the tensile strength [N/cm$^2$] is divided by an apparent density [g/cm$^3$] of a non-woven fabric obtained by a method described later to obtain a specific strength. In addition, the specific strength is defined as an average of values obtained by assessment of sampling of at least 5 or more of 200 mm length in a pleats processing direction (MD direction) of the non-woven fabric.

<Glass Transition Temperature of Resin>

A resin component is collected from a non-woven fabric, and is assessed using a DSC method (high sensitive differential calorimetry method). The assessment Number N is 2 or more, and an arithmetic average is utilized.

<Electrification Processed Non-Woven Fabric Quality Factor>

An electrification-processed non-woven fabric is set in a testing machine according to JIS B9908 (2001) format 3 test method, and the electrification-processed non-woven fabric quality factor is obtained by the following equation.

Electrification-processed non-woven fabric quality factor=−Ln($T$)/Δ$P$

T is permeability of an atmospheric air dust particle contained in the general external air having a diameter of 0.3 μm to 0.5 μm, of an electrification-processed non-woven fabric (hereinafter, referred to as "0.3μ particle permeability")

$T=1-(C_0/C_1)$ $C_0$=Number of particles of diameter of 0.3 μm to 0.5 μm collected in assessment sample
$C_1$=Number of particles of diameter of 0.3 μm to 0.5 μm supplied to assessment sample
ΔP is pressure drop (Pa) by an electrification-processed non-woven fabric.

Permeability T of an atmospheric air dust particle and pressure drop ΔP by an electrification-processed non-woven fabric are obtained at a measurement rate of 4.5 m/min. In addition, the assessment Number N is 2 or more, and an arithmetic average is utilized.

<Measurement of Average Fiber Diameter of Melt Blown Non-Woven Fabric>

A surface of a melt blown non-woven fabric is observed with SEM at magnification of 500-fold or more, a fiber width of 500 or more fabrics is randomly measured, and an arithmetic average is utilized.

<Measurement of Non-Woven Fabric, Electrified Non-Woven Fabric Pressure Drop>

An assessment sample is set in a testing machine according to JIS B9908 (2001) format 3 test method, and a pressure drop is obtained by setting a rate of the air passing through the assessment sample at 4.5 m/min. The assessment Number N is 2 or more, and an arithmetic average is utilized.

<Filtering Medium Quality Factor>

For a filtering medium quality factor, a filtering medium is set in an assessment equipment according to JIS B9908 (2001) format 3 test method, the air is flown at a filtering medium penetration air rate of 4.5 m/min, and a filtering medium initial pressure drop (ΔP$_1$) is obtained. Then, until the time point at which a pressure drop reaches a final pressure drop of ΔP$_1$+150 Pa, 15 kinds of dusts described in JIS 28901 (1974) are supplied, and permeability T$_1$ of 15 kinds of JIS dusts is obtained by the following equation from an amount (W$_1$) of a dust collected with an assessment filtering medium, and an amount (W$_2$) of a dust collected with an absolute filter on a downstream side, which is not captured with the assessment filtering medium.

$T_1=1-(W_1/(W_1+W_2))$ $W_1$=Mass of 15 kinds of JIS dust particles collected with assessment filtering medium
$W_2$=Mass of 15 kinds of JIS dust particles collected with absolute filter Further, by introducing permeability T$_1$ of 15 kinds of JIS dust particles into the equation obtaining the filtering medium quality factor, the quality factor is obtained by the following equation.

Filtering medium quality factor=−Ln($T_1$)/Δ$P_1$

T$_1$ is permeability of 15 kinds of JIS dust particles.
ΔP$_1$ is a filtering medium initial pressure drop (Pa).
The assessment Number N of the filtering medium quality factor is 2 or more, and an arithmetic average is utilized.

<Filter Unit Quality Factor>

For the filter unit quality factor, a filter unit of a filter size, width 240 mm×length 255 mm×thickness 10 mm, is set in an assessment equipment according to JIS B9908 (2001) format 3 test method, the air is flown at a flow rate of 525 m$^3$/hr, and a filter unit initial pressure drop (ΔP$_2$) is obtained. Then, until a pressure drop approaches a final pressure drop 200 Pa, 15 kinds of dusts described in JIS 28901 (1974) are supplied, and permeability T$_2$ of 15 kinds of JIS dust particles in the filter unit is obtained by the following equation from an amount (W$_3$) of a dust captured in the filter unit, and an amount (W$_4$) of a dust captured in an absolute filter on a downstream side, which is not captured in an assessment unit.

$T_2=-1(W_3/(W_3+W_4))$ $W_3$=Mass of 15 kinds of JIS dust particles captured with filter unit
$W_4$=Mass of 15 kinds of JIS dust particles captured with absolute filter Further, by introducing permeability T$_2$ of 15 kinds of JIS dust particles into the equation obtaining the unit quality factor, the quality factor is obtained by the following equation.

Filter unit quality factor=−Ln($T_2$)/Δ$P_2$

T$_2$ is permeability of 15 kinds of JIS dust particles.
ΔP$_2$ is a filter unit initial pressure drop (Pa).
The assessment number N of the filter unit quality factor is 2 or more, and an arithmetic average is utilized.

<Apparent Density of Non-Woven Fabric>

Using SM114 manufactured by Teclock Corporation, and at a measurement density of one place per 100 cm$^2$ of a sample area, a thickness of a total of 21 places or more is obtained, and an arithmetic average is calculated. In addition, for a filtering medium weight, a mass of a non-woven fabric is obtained, and converted into a mass per 1 m$^2$ from its area, which is adopted as a weight. A sampling minimum area is 0.01 m$^2$ or more, the number of fabrics of a sample to be assessed is 2 or more, and an arithmetic average thereof is used.

From a thickness and a weight of the non-woven fabric obtained by the aforementioned methods, an apparent density of the non-woven fabric is obtained by the following equation.

Apparent density of non-woven fabric (g/cm$^2$)=filtering medium weight (g/cm$^2$)/filtering medium thickness (cm)×10000

<Flame Retardancy>

Measurement is performed according to JIS L1091 (1999) A-3 method.

Example 1

By a wet paper making method of a slant wire method, a fiber aggregation of a weight of 37.5 g/m² constructed of a non-crimped polyvinyl alcohol fiber (20% by mass of one having a Young's modulus of 180 cN/dtex, a fineness of 7 dtex, and a fiber length of 10 mm), a non-crimped polyester fiber ((1) 21% by mass of one having a Young's modulus of 65 cN/dtex, a fineness of 10 dtex, and a fiber length of 10 mm, (2) 49% by mass of one having a Young's modulus of 65 cN/dtex, a fineness of 17 dtex, and a fiber length of 18 mm), and a pulp (10% by weight) was made. Thereafter, the fiber aggregation was impregnated with a solid matter 30% solution of a styrene-acryl polymer (glass transition temperature Tg 30° C., film making temperature 45° C.), was dried and heated to make a non-woven fabric having a weight of 46.8 g/m², a thickness of 0.410 mm, air permeability of 375 cm³/cm²·sec (two piled), an apparent density of 0.114 g/cm³, a tensile strength at 1% elongation of 180 N/cm², and a specific strength of 1579 N·cm/g. The pressure drop of this non-woven fabric was 1.6 Pa.

An electrification non-woven fabric (polypropylene melt blown non-woven fabric having a weight of 12 g/m², an average fiber diameter of 6.0 μm, a pressure drop of 1.8 Pa, 0.3 μl particle permeability T=0.75, a thickness of 0.12 mm, and an electrification-processed non-woven fabric quality factor of 0.16) was adhered to this non-woven fabric to make a filtering medium of a thickness of 0.535 mm which can also capture a fine dust (pressure drop 3.5 Pa, permeability of 15 kinds of JIS dusts $T_1$=0.08, filtering medium quality factor 0.72).

This filtering medium was pleats-processed to have a crest height of 8 mm, and placed into a frame body having a filter size of width 240 mm, length 255 mm, and thickness 10 mm, so that a filtering medium area became 0.35 m², to make a filter unit.

The unit pressure drop of this filter unit was measured at an air flow of 525 m³/hr, and as a result, the pressure drop was 70 Pa (structure pressure drop 50.6 Pa). When 15 kinds of JIS dusts were loaded on this unit and the life property was obtained, it was found that, in this unit, the permeability of 15 kinds of JIS dusts $T_2$=0.09, the adhesion amount of 15 kinds of JIS dusts=13 g/unit, and the filter unit quality factor=0.034, and this was performance that can be used as high performance filter for automobile conditioning (a noise is not much anxious, the pressure drop is 70 Pa or less so that an air conditioning efficiency is not reduced, and 15 kinds of JIS dusts capturing efficiency as performance capable of approximately arresting invasion of a pollen is 91% or more).

Conditions and results are shown in Table 1 and Table 2.

Example 2

The same procedure as that of Example 1 was performed except that a construction fiber of the non-woven fabric was changed, and operation was as in Table 1 and Table 2. As a result, a filter unit having little occurrence of a structure pressure drop was made. In addition, it was confirmed that the filter unit was a filter which performs low pressure drop, high capturing capability, and a long life.

Example 3

The same procedure as that of Example 1 was performed except that a construction fiber of the non-woven fabric was changed, and operation was as shown in Table 1 and Table 2.

Since a fiber having a high Young's modulus was used, a non-woven fabric having a further higher specific strength as compared with Examples 1 and 2 could be obtained; as a result, a filter unit having a smaller structure pressure drop could be made. In addition, it was confirmed that the filter unit was a filter which performs low pressure drop, high capturing capability, and a long life.

Example 4

The same procedure as that of Example 1 was performed except that a construction fiber of the non-woven fabric was changed, the solid matter 30% solution of a styrene-acryl polymer was changed to one having a glass transition temperature Tg of 35° C. and a film making temperature of 55° C., and operation was as in Table 3 and Table 4.

Since a fiber length was great, and those single fibers were fixed with a styrene-acryl polymer having high Tg, a non-woven fabric having a further higher specific strength than those of Examples 1 to 3 could be obtained. As a result, a filter unit having a smaller structure pressure drop could be made. In addition, it was confirmed that the filter unit was a filter which performs low pressure drop, high capturing capability, and a long life.

Example 5

The same procedure as that of Example 4 was performed except that the solid matter 30% solution of a styrene-acryl polymer was changed to one having a glass transition temperature Tg of 50° C. and a film making temperature of 80° C., and operation was as in Table 3 and Table 4.

Since a fiber length was great and those single fibers were fixed with a styrene-acryl polymer having further higher Tg than that of Example 4, a non-woven fabric having a further higher specific strength could be obtained. As a result, a filter unit having a smaller structure pressure drop could be made. In addition, it was confirmed that the filter unit was a filter which performs low pressure drop, high capturing capability, and a long life.

In addition, regarding the non-woven fabric used, when a specific strength was measured under the atmosphere of 60° C., little reduction was recognized at 4200 N·cm/g. From this result, it was confirmed that the non-woven fabric was a non-woven fabric which was little in filtering medium deformation due to heat, and was excellent in heat resistance even when used at a place to be warmed near an engine.

Example 6

The same procedure as that of Example 2 was performed except that a binder in which calcium carbonate (average particle diameter 4 micron) was mixed in a solid matter 30% solution of a styrene-acryl polymer (Tg 30° C., film making temperature 45° C.) at a dry weight ratio of 10% relative to a dry weight of the styrene-acryl polymer was prepared, a fiber aggregation was impregnated with this binder, and operation was as in Table 3 and Table 4.

A particle-like substance was contained in the solid matter 30% solution of a styrene-acryl polymer (Tg 30° C., film making temperature 45° C.). As a result, a non-woven fabric having a higher specific strength as compared with Example 2 could be obtained, and a filter unit having a small structure pressure drop could be made. In addition, it was confirmed that the filter unit was a filter which performs a low pressure drop, high capturing capability, and a long life.

Example 7

The same procedure as that of Example 2 was performed except that a binder in which flame-retardant melamine phosphate (water-insoluble) was mixed in a solid matter 30% solution of a styrene-acryl polymer (Tg 30° C., film making temperature 45° C.) at a dry weight ratio of 46.7% relative to a dry weight of the styrene-acryl polymer was prepared, a fiber aggregation was impregnated with this binder, and an operation was as in Table 5 and Table 6.

From observation of a surface of the non-woven fabric, particles having an average particle diameter of 10 µm were formed by precipitation in the interior and on a surface of a styrene-acryl polymer. A particle-like substance was contained in the styrene-acryl polymer. As a result, a non-woven fabric having a higher specific strength as compared with Example 2 could be obtained, and a filter unit having a small structure pressure drop could be made. In addition, it was confirmed that the filter unit was a filter which performs low pressure drop, high capturing capability, and a long life. Further, when flame retardancy of the filtering medium was assessed, a self-extinguishing property passing A-3 method was confirmed.

Example 8

The same procedure as that of Example 2 was performed except that the electrification non-woven fabric was changed to a polypropylene melt blown electrification non-woven fabric having a weight of 22 g/m$^2$, an average fiber diameter of 6.0 µm, a pressure drop of 3.7 Pa, 0.3µ particle permeability T=0.35, a thickness of 0.21 mm, and an electrification-processed non-woven fabric quality factor of 0.28, and operation was as in Table 5 and Table 6.

As a result, since an electrification non-woven fabric having a great weight was used, capturing performance was increased. In addition, it was confirmed that a pressure drop was low and a life was long regardless of a filter unit having a high capturing capability.

Example 9

The same procedure as that of Example 2 was performed except that the electrification non-woven fabric was changed to a friction electrification-processed non-woven fabric of a weight of 16 g/m$^2$ (pressure drop 0.5 Pa, 0.3µ particle permeability T=0.61, thickness 0.2 mm, electrification-processed non-woven fabric quality factor 0.99) in which a polyester short fiber (fineness 5 dtex, fiber diameter 22.0 µm) and a polypropylene short fiber (fineness 5 dtex, fiber diameter 26.3 µm) were mixed at each weight ratio of 50%, and operation was as in Table 5 and Table 6.

Although a filtering medium was a filtering medium having a relatively great thickness, the filtering medium became a low pressure drop filtering medium, and the unit pressure drop was low, like Example 7. In addition, it was confirmed that a filter was a long life filter regardless of a filter unit having a high capturing capability.

Example 10

The same procedure as that of Example 4 was performed except that a construction fiber of the non-woven fabric was changed, the solid matter 30% solution of the styrene-acryl polymer was changed to a similar solid matter 10% solution and, further, another electrification non-woven fabric was not adhered to the resulting non-woven fabric, but pure water was sprayed to the resulting the non-woven fabric to perform electrification processing by a hydro-charge method, and operation was as in Table 7 and Table 8.

As a result, it was confirmed that a filter unit was a high performance filter unit having a high capturing capability and a low pressure drop in spite of a filtering medium of only one non-woven fabric layer.

Example 11

The same procedure as that of Example 1 was performed except that a construction fiber of the non-woven fabric was changed, the electrification non-woven fabric was changed to a polypropylene melt blown electrification non-woven fabric having a weight of 10 g/m$^2$, an average fiber diameter of 5.0 a pressure drop of 1.6 Pa, 0.3µ particle permeability T=0.77, a thickness of 0.08 mm, and an electrification-processed non-woven fabric quality factor of 0.16 and, further, a filtering medium area in the filter unit was changed to 0.42 m$^2$, and operation was as in Table 7 and Table 8.

As a result, a non-woven fabric having a high specific strength could be obtained although a weight was small and the fabric was thin. For this reason, even when the filtering medium was installed with a narrow pleats crest interval, a filter unit having little occurrence of a structure pressure drop, a low pressure drop, a high capturing capability and a long life could be made.

Example 12

By an air laid method, a fiber aggregation of a weight of 37.5 g/m$^2$ constructed of a non-crimped polyvinyl alcohol fiber (30% by mass of one having a Young's modulus of 180 cN/dtex, a fineness of 7 dtex, and a fiber length of 20 mm), and a non-crimped core sheath-type polyester fiber (sheath component melting point 154° C., core component melting point 265° C., (1) 21% by mass of one having a Young's modulus of 65 cN/dtex, a fineness of 9.6 dtex, and a fiber length of 15 mm, and (2) 49% by mass of one having a Young's modulus of 65 cN/dtex, a fineness of 16.2 dtex, and a fiber length of 24 mm) was made. Thereafter, the warm air at 190° C. was acted on the fiber aggregation to bring out the state where a sheath component of the polyester core sheath fiber was melted, and the aggregate was compressed with a calendar roll regulated at 25° C. to make a non-woven fabric having a thickness of 0.40 mm, air permeability of 390 cm$^3$/cm$^2$·sec (two piled), an apparent density of 0.094 g/cm$^3$, a tensile strength at 1% elongation of 120 N/cm$^2$, and a specific strength of 1277 N·cm/g was made. The pressure drop of this non-woven fabric was 1.5 Pa.

To this non-woven fabric an electrification non-woven fabric (polypropylene melt blown non-woven fabric having a weight of 12 g/m$^2$, an average fiber diameter of 6.0 µm, a pressure drop of 1.8 Pa, a 0.3µ particle permeability T=0.75, a thickness of 0.12 mm, and an electrification-processed non-woven fabric quality factor of 0.16) was adhered to make a filtering medium having a thickness of 0.53 mm (pressure drop 3.3 Pa, 15 kinds of JIS dusts permeability $T_1$=0.08, filtering medium quality factor 0.77) which could also capture a fine dust.

This filtering medium was pleats-processed to have a crest height of 8 mm, and placed into a frame body having a filter size of width 240 mm, length 255 mm, and thickness 10 mm, so that a filtering medium area became 0.35 m², to make a filter unit.

The unit pressure drop of this filter unit was measured at an air flow of 525 m³/hr. As a result, it was found to be 67.8 Pa (structure pressure drop 49.5 Pa). When life property was obtained by loading 15 kinds of JIS dusts to this unit, 15 kinds of JIS dusts permeability $T_2$ in the unit=0.085, an adhered amount of 15 kinds of JIS dusts=14 g/unit, and filer unit quality factor=0.036, and this was such a performance that the unit can be used as a high performance filter for automobile air conditioning.

As a process for producing the filtering medium, an air laid method was used, a thermal adhesive fiber was used, a fiber length was made to be great, and the fibers was fixed, and as a result, a higher specific strength was obtained regardless of a low non-woven fabric apparent density, and a high life property as unit performance was obtained.

Conditions and results are shown in Table 7 and Table 8.

Example 13

Through an air laid method, a fiber aggregation of a weight of 37.5 g/m², in which fibers were fixed, constructed of a non-crimped polyvinyl alcohol fiber (30% by weight of one having a Young's modulus of 180 cN/dtex, a fineness of 7 dtex, and a fiber length of 20 mm), and a non-crimped core sheath-type polyester fiber (sheath component melting point 154° C., core component melting point 265° C., (1) 21% by mass of one having a Young's modulus of 65 cN/dtex, a fineness of 9.6 dtex, a fiber length of 15 mm), (2) 49% by mass of one having a Young's modulus of 65 cN/dtex, a fineness of 16.2 dtex, a fiber length of 24 mm) was made. Thereafter, the fiber aggregation was impregnated with a solid matter 30% solution of a styrene-acryl polymer (glass transition temperature Tg of 30° C., film making temperature of 45° C.), the warm air at 190° C. is acted on the air aggregate, the aggregate was drying heat-treated to render a weight 39.5 g/m², and compressed with a calendar roll regulated at 25° C. to make a non-woven fabric having a thickness of 0.43 mm, air permeability of 400 cm³/cm²·sec (two piles), an apparent density of 0.092 g/cm³, a tensile strength at 1% elongation of 130 N/cm², and a specific strength of 1413 N·cm/g. The pressure drop of this non-woven fabric was 1.4 Pa.

To this non-woven fabric an electrification non-woven fabric (polypropylene melt blown non-woven fabric of a weight of 12 g/m², an average fiber diameter of 6.0 μM, pressure drop of 1.8 Pa, 0.3μ particle permeability T=0.75, a thickness of 0.12 mm, an electrification-processed non-woven fabric quality factor of 0.16) was adhered to make a filtering medium of a thickness of 0.53 mm (pressure drop 3.2 Pa, 15 kinds of JIS dusts permeability $T_1$=0.08, filtering medium quality factor 0.79) which could also capture a fine dust.

This filtering medium was pleats-processed to have a crest height of 8 mm, and placed into a frame body having a filter size of width 240 mm, length 255 mm, and thickness 10 mm, so that a filtering medium area became 0.35 m², to make a filter unit.

The unit pressure drop of this filter unit was measured at an air flow of 525 m³/hr. As a result, it was found to be 67.3 Pa (structure pressure drop 49.5 Pa). When the life property was obtained by loading 15 kinds of JIS dusts to this unit, 15 kinds of JIS dusts permeability in this unit $T_2$=0.085, amount of adhesion of 15 kinds of JIS dusts=14.6 g/unit, and filter unit quality factor=0.037, and this was such a performance that the unit could be used as a high performance filter for automobile air conditioning.

By using an air laid method as a process for producing the filtering medium, and using a thermal adhesive fiber and a resin for fixing fibers, a high specific strength was obtained regardless of a low non-woven fabric apparent density, and a high life property of unit performance was obtained.

Conditions and results are shown in Table 9 and Table 10.

Example 14

By an air laid method, a fiber aggregation constructed of a non-crimped polyvinyl alcohol fiber (40% by weight of one having a Young's modulus of 250 cN/dtex, a fineness of 17 dtex, and a fiber length of 12 mm), a non-crimped core sheath-type modified PP/PP fiber (50% by mass of one having a Young's modulus of 45 cN/dtex, a fineness of 2.2 dtex, a fiber length of 10 mm, a sheath component modified polypropylene melting point of 129° C., and a core component polypropylene melting point of 165° C.), and a non-crimped polypropylene fiber (10% by mass of one having a Young's modulus of 130 cN/dtex, a fineness of 3.0 dtex, and a fiber length of 15 mm) was obtained. The heated air at 145° C. was passed through this to melt only sheath side modified PP (polyolefin, polyethylene copolymerized polymer, melting point 129° C.) of the core sheath-type modified PP/PP fiber, to fix fibers with other fiber, and this was pressed to make a non-woven fabric of a thickness of 0.7 mm (weight 80 g/m², thickness 0.70 mm, specific strength 1052 N·cm/g). Thereafter, the non-woven fabric was washed with water to remove a lubricant adhered to a fiber, and electret processing was performed by a hydro-charge method to obtain an electrified filtering medium of one layer structure.

This filtering medium was pleats-processed to have a crest height of 8 mm, and placed into a frame body having a filter size of width 240 mm, length 255 mm, and thickness 10 mm, so that a filtering medium area became 0.28 m², to make a filter unit.

The unit pressure drop of this filter unit was measured at an airflow of 525 m³/hr. As a result, JIS 15 kinds of dusts permeability $T_2$=0.074, an adhesion amount of 15 kinds of JIS dusts=16 g/unit, and a filter unit quality factor=0.037 although the pressure drop was relatively high as 71.0 Pa. A filter unit of a long life having a low 0.3 μm particle permeability could be obtained.

Conditions and results are shown in Table 9 and Table 10.

Example 15

By an air laid method, a fiber aggregation constructed of a non-crimped aromatic polyamide fiber (40% by mass of one having a Young's modulus of 4400 cN/dtex, a fineness of 17 dtex, and a fiber length of 10 mm), a non-crimped polypropylene fiber (10% by mass of one having a Young's modulus of 130 cN/dtex, a fineness of 3 dtex, and a fiber length of 15 mm), and a non-crimped core sheath-type modified PP/PP fiber (50% by mass of one having a Young's modulus of 45 cN/dtex, a fineness of 2.2 dtex, a fiber length of 10 mm, a sheath component modified polypropylene melting point of 129° C., and a core component polypropylene melting point of 165° C.) was obtained. The heated air at 145° C. was passed through this to melt only a sheath side modified PP (polyolefin, polyethylene copolymerized polymer, melting point 129° C.) of the core sheath-type modified PP/PP fiber, to fix fibers with other fiber; thereafter, pressure was applied at 120° C. or less to make a non-woven fabric of a thickness of 0.7 mm (weight 80 g/m², thickness 0.70 mm, specific strength 5439 N·cm/g). This fiber aggregation was washed with water to remove a lubricant adhered to the fiber, and the electret processing was performed by a hydro-charge method to obtain an electrified filtering medium of one layer structure.

When this filtering medium was pleats-processed to have a crest height of 8 mm, there was a problem that an aromatic polyamide fiber having high stiffness at a crest part of a pleats part was partially excluded at a fiber fixing part, and was split finely.

In addition, the pleats-processed filtering medium was placed into a frame body having a filter size of width 240 mm, length 255 mm, and thickness 10 mm, so that a filtering medium area became 0.28 m², to make a filter unit.

The unit pressure drop of this filter unit was measured at an air flow of 525 m³/hr. As a result, the pressure drop was low as 49.2 Pa, and the effect of a high specific strength was obtained. In addition, permeability of 15 kinds of JIS dusts $T_2$=0.072, an adhesion amount of 15 kinds of JIS dusts=20 g/unit, and filter unit quality factor=0.053, and higher performance than that of Example 14 could be obtained. However, as described above, since the fineness of the aromatic polyamide single fiber used was great, and the Young's modulus was high, there was a problem that the crest part of the pleats-processed filtering medium was split finely.

Conditions and results are shown in Table 9 and Table 10.

Comparative Example 1

In order to test influence of a Young's modulus of a single fiber on a specific strength, the same procedure as that of Example 1 was performed except that a construction fiber of the non-woven fabric was changed, and operation was as in Table 11 and Table 12.

As a result, the resulting filter unit was higher both in an unit pressure drop and a structure pressure drop than Example 1, and a capturing capability was worse, and a life was short.

Comparative Example 2

The same procedure as that of Comparative Example 1 was performed except that the solid matter 30% solution of a styrene-acryl polymer was changed to one having a glass transition temperature Tg of 25° C. and a filmmaking temperature of 32° C., and operation was as in Table 11 and Table 12.

The resulting non-woven fabric was a non-woven fabric having a great filtering medium deformation degree; as a result, a filter unit was higher in both of an unit pressure drop and a structure pressure drop than Example 1, exceeding an initial pressure drop required for a filter for automobile air conditioning. In addition, a capturing capability was worse, and a life was short.

Comparative Example 3

The same procedure as that of Example 1 was performed except that a construction fiber of the non-woven fabric was changed and not by the wet paper making method of a slant wire method but by a dry chemical bonding method, and operation was as in Table 11 and Table 12.

The resulting non-woven fabric was a non-woven fabric having a great filtering medium deformation degree; as a result, a filter unit was further higher in both of an unit pressure drop and a structure pressure drop than Example 1, exceeding an initial pressure drop required for a filter for automobile air conditioning. In addition, a capturing capability was further worse, and a life was short.

Comparative Example 4

The same procedure as that of Example 1 was performed except that a construction fiber of the non-woven fabric was changed, and operation was as in Table 13 and Table 14.

The resulting non-woven fabric was a non-woven fabric having a great filtering medium deformation degree; as a result, a filter unit was higher in both of an unit pressure drop and a structure pressure drop than Example 1, exceeding an initial drop required for a filter for automobile air conditioning. In addition, a capturing capability was worse, and a life was short.

Comparative Example 5

The same procedure as that of Example 1 was performed except that a construction fiber of the non-woven fabric was changed, and operation was as in Table 13 and Table 14.

The resulting non-woven fabric was a non-woven fabric having a great filtering medium deformation degree; as a result, a filter unit was higher in both of an unit pressure drop and a structure pressure drop than Example 1, exceeding an initial drop required for a filter for automobile air conditioning. In addition, since a ratio of a fiber of 6 dtex or less occupied in a total fiber mass exceeded 30%, choking was easily caused, a life was short, and a capturing efficiency was not sufficiently increased by a final pressure drop, a capturing capability was also worse.

Comparative Example 6

The same procedure as that of Example 1 was performed except that the solid matter 30% solution of a styrene-acryl polymer was changed to one having a glass transition temperature Tg of 25° C. and a film making temperature of 32° C., and operation was as shown in Table 13 and Table 14.

Since the styrene-acryl resin was soft, adherability was recognized on a surface of the resulting non-woven fabric. In addition, the resulting non-woven fabric was a non-woven fabric having a great filtering medium deformation degree; As a result, a filter unit was higher in both of an unit pressure drop and a structure pressure drop than Example 1, exceeding an initial drop required for a filter for automobile air conditioning. In addition, a capturing capability was worse, and a life was short.

Comparative Example 7

The same procedure as that of Example 1 was performed except that a construction fiber of the non-woven fabric was changed, and operation was as in Table 15 and Table 16.

Since a blending rate of a non-crimped fiber of a Young's modulus of 150 cN/dtex or more and a fineness of 7 dtex or more occupied in a total fiber mass was 15%, the resulting non-woven fabric was a non-woven fabric having a great filtering medium deformation degree; as a result, a filter unit was higher in both of an unit pressure drop and a structure pressure drop than Example 1, exceeding an initial drop required for a filter for automobile air conditioning. In addition, a capturing capability was worse, and a life was short.

Comparative Example 8

The same procedure as that of Example 1 was performed except that a construction fiber of the non-woven fabric was changed, and operation was as in Table 15 and Table 16.

Since a blending rate of a fiber having a Young's modulus of 150 cN/dtex or more occupied in a total fiber mass was 25%, but the fiber had a fineness of 3 dtex, the resulting non-woven fabric was a non-woven fabric having low air permeability and a great filtering medium deformation degree; as a result, a filter unit was higher in both of an unit pressure drop and a structure pressure drop than Example 1, exceeding an initial drop required for a filter for automobile air conditioning. In addition, a capturing capability was worse, and a life was short.

TABLE 1

| | | | Young's modulus [cN/dtex] | Fineness [dtex] | Fiber length [mm] | Example 1 | Example 2 | Example 3 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
| | | | 150 | 3 | 10 | 0 | 0 | 0 |
| | | | 150 | 7 | 10 | 0 | 0 | 0 |
| | | | 180 | 7 | 10 | 20 | 24 | 0 |
| | | | 180 | 7 | 20 | 0 | 0 | 0 |
| | | | 250 | 6.7 | 10 | 0 | 0 | 0 |
| | | | 250 | 17 | 12 | 0 | 49 | 0 |
| | | | 320 | 7 | 10 | 0 | 0 | 24 |
| | | | 320 | 17 | 12 | 0 | 0 | 49 |
| | | | 320 | 17 | 18 | 0 | 0 | 0 |
| | | | 330 | 2.2 | 10 | 0 | 0 | 17 |
| | | Polyester fiber | 65 | 1.3 | 5 | 0 | 0 | 0 |
| | | | 65 | 3 | 10 | 0 | 0 | 0 |
| | | | 65 | 10 | 10 | 21 | 0 | 0 |
| | | | 65 | 17 | 18 | 49 | 0 | 0 |
| | | | 95 | 1.3 | 5 | 0 | 9 | 0 |
| | | | 95 | 3 | 10 | 0 | 8 | 0 |
| | | Aromatic polyamide fiber | 4400 | 17 | 10 | 0 | 0 | 0 |
| | | Core sheath-type polyester fiber | 65 | 9.6 | 15 | 0 | 0 | 0 |
| | | | 65 | 16.2 | 24 | 0 | 0 | 0 |
| | | Polypropylene fiber | 130 | 3 | 15 | 0 | 0 | 0 |
| | | Core sheath-type modified PP/PP | 45 | 2.2 | 10 | 0 | 0 | 0 |
| | | Fibrous binder PVA fiber | 65 | 10 | 7 | 0 | 0 | 0 |
| | Crimped | Polyester fiber | 45 | 6 | 24 | 0 | 0 | 0 |
| | | Polyvinyl alcohol fiber | 120 | 7 | 28 | 0 | 0 | 0 |
| Pulp | | | | | | 10 | 10 | 10 |
| Glass transition temperature Tg [° C.] of resin fixing single fibers | | | | | | 30 | 30 | 30 |
| Particle-like substance | | | | | | 0 | 0 | 0 |

TABLE 2

| | | Example 1 | Example 2 | Example 3 |
|---|---|---|---|---|
| Non-woven fabric construction | Non-woven fabric production process | Slant wire | Slant wire | Slant wire |
| | Construction fiber amount (g/m$^2$) | 37.5 | 37.5 | 37.5 |
| | Amount of resin fixing single fibers (g/m$^2$) | 9.3 | 9.3 | 8.2 |
| | Particle-like substance (%/adhesion amount g/m$^2$) | 0 | 0 | 0 |
| | Non-woven fabric weight (g/m$^2$) | 46.8 | 46.8 | 45.7 |
| | Non-woven fabric thickness (mm) | 0.410 | 0.425 | 0.446 |
| | Air permeability (cm$^3$/cm$^2$ · sec) | 375 | 350 | 377 |
| | Non-woven fabric apparent density (g/cm$^3$) | 0.114 | 0.11 | 0.102 |
| | Tensile strength at 1% elongation (N/cm$^2$) | 180 | 381 | 470 |
| | Specific strength (N · cm/g) | 1579 | 3464 | 4608 |
| | Pressure drop (Pa) | 1.6 | 1.7 | 1.6 |
| | Electrification processing (containing PP short fiber) | None | None | None |
| Electrification-processed non-woven fabric | Material | PPMB | PPMB | PPMB |
| | Fiber diameter (μm) | 6 | 6 | 6 |
| | Weight (g/m$^2$) | 12 | 12 | 12 |
| | Thickness (mm) | 0.12 | 0.12 | 0.12 |
| | Pressure drop (Pa) | 1.8 | 1.8 | 1.8 |
| | 0.3 μm particle permeability | 0.75 | 0.75 | 0.75 |
| | Electrification-processed non-woven fabric QF value | 0.16 | 0.16 | 0.16 |
| Filtering medium | Thickness (mm) | 0.535 | 0.55 | 0.57 |
| | Pressure drop (Pa) | 3.5 | 3.6 | 3.5 |
| | JIS 15 kinds of dusts permeability $T_1$ | 0.08 | 0.08 | 0.08 |
| | Filtering medium QF value | 0.72 | 0.70 | 0.72 |
| Unit | Size (mm) | 240 × 255 × 10 | 240 × 255 × 10 | 240 × 255 × 10 |
| | Filtering medium crest height (mm) | 8 | 8 | 8 |
| | Air flow (m$^3$/min) | 525 | 525 | 525 |
| | Filtering medium area (m$^2$) | 0.35 | 0.35 | 0.35 |
| | Filtering medium penetration air rate (m/min) | 25 | 25 | 25 |
| | Unit pressure drop (Pa) | 70 | 40 | 32 |
| | Filtering medium pressure drop (Pa) | 19.4 | 20.0 | 19.4 |
| | Structure pressure drop (Pa) | 50.6 | 20.0 | 12.6 |
| | Structure pressure drop ratio (%) | 72.2 | 50.0 | 39.2 |
| | JIS 15 kinds of dusts permeability $T_2$ | 0.090 | 0.090 | 0.089 |

TABLE 2-continued

|  | Example 1 | Example 2 | Example 3 |
|---|---|---|---|
| JIS 15 kinds of dusts adhesion amount (g/unit) | 13 | 15 | 16 |
| Filter unit QF value | 0.034 | 0.060 | 0.075 |

PPMB: Polypropylene melt blown non-woven fabric
PP/PET: Friction electrification-processed non-woven fabric of polyester short fiber and polypropylene short fiber

TABLE 3

| | | | Young's modulus | Fineness [dtex] | Fiber length [mm] | Example 4 | Example 5 | Example 6 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
| | | | 150 | 3 | 10 | 0 | 0 | 0 |
| | | | 150 | 7 | 10 | 0 | 0 | 0 |
| | | | 180 | 7 | 10 | 0 | 0 | 24 |
| | | | 180 | 7 | 20 | 0 | 0 | 0 |
| | | | 250 | 6.7 | 10 | 0 | 0 | 0 |
| | | | 250 | 17 | 12 | 0 | 0 | 49 |
| | | | 320 | 7 | 10 | 0 | 0 | 0 |
| | | | 320 | 17 | 12 | 24 | 24 | 0 |
| | | | 320 | 17 | 18 | 49 | 49 | 0 |
| | | | 330 | 2.2 | 10 | 0 | 0 | 0 |
| | | Polyester fiber | 65 | 1.3 | 5 | 0 | 0 | 0 |
| | | | 65 | 3 | 10 | 0 | 0 | 0 |
| | | | 65 | 10 | 10 | 0 | 0 | 0 |
| | | | 65 | 17 | 18 | 0 | 0 | 0 |
| | | | 95 | 1.3 | 5 | 9 | 9 | 9 |
| | | | 95 | 3 | 10 | 8 | 8 | 8 |
| | | Aromatic polyamide fiber | 4400 | 17 | 10 | 0 | 0 | 0 |
| | | Core sheath-type polyester fiber | 65 | 9.6 | 15 | 0 | 0 | 0 |
| | | | 65 | 16.2 | 24 | 0 | 0 | 0 |
| | | Polypropylene fiber | 130 | 3 | 15 | 0 | 0 | 0 |
| | | Core sheath-type modified PP/PP | 45 | 2.2 | 10 | 0 | 0 | 0 |
| | | Fibrous binder PVA fiber | 65 | 10 | 7 | 0 | 0 | 0 |
| | Crimped | Polyester fiber | 45 | 6 | 24 | 0 | 0 | 0 |
| | | Polyvinyl alcohol fiber | 120 | 7 | 28 | 0 | 0 | 0 |
| | Pulp | | | | | 10 | 10 | 10 |
| Glass transition temperature Tg [° C.] of resin fixing single fibers | | | | | | 35 | 50 | 30 |
| Particle-like substance | | | | | | 0 | 0 | 10%. 4.0 μm |

TABLE 4

|  |  | Example 4 | Example 5 | Example 6 |
|---|---|---|---|---|
| Non-woven fabric construction | Non-woven fabric production process | Slant wire | Slant wire | Slant wire |
| | Construction fiber amount (g/m²) | 37.5 | 37.5 | 37.5 |
| | Amount of resin fixing single fibers (g/m²) | 9.3 | 9.3 | 8.55 |
| | Particle-like substance (%/adhesion amount g/m²) | 0 | 0 | 10%/0.95 |
| | Non-woven fabric weight (g/m²) | 46.8 | 46.8 | 47 |
| | Non-woven fabric thickness (mm) | 0.433 | 0.433 | 0.427 |
| | Air permeability (cm³/cm² · sec) | 410 | 410 | 348 |
| | Non-woven fabric apparent density (g/cm³) | 0.108 | 0.108 | 0.11 |
| | Tensile strength at 1% elongation (N/cm²) | 513 | 530 | 415 |
| | Specific strength (N · cm/g) | 4750 | 4907 | 3773 |
| | Pressure drop (Pa) | 1.5 | 1.5 | 1.7 |
| | Electrification processing (containing PP short fiber) | None | None | None |
| Electrification-processed non-woven fabric | Material | PPMB | PPMB | PPMB |
| | Fiber diameter (μm) | 6 | 6 | 6 |
| | Weight (g/m²) | 12 | 12 | 12 |
| | Thickness (mm) | 0.12 | 0.12 | 0.12 |
| | Pressure drop (Pa) | 1.8 | 1.8 | 1.8 |
| | 0.3 μm particle permeability | 0.75 | 0.75 | 0.75 |
| | Electrification-processed non-woven fabric QF value | 0.16 | 0.16 | 0.16 |
| Filtering medium | Thickness (mm) | 0.56 | 0.56 | 0.55 |
| | Pressure drop (Pa) | 3.4 | 3.4 | 3.6 |
| | JIS 15 kinds of dusts permeability $T_1$ | 0.08 | 0.08 | 0.08 |
| | Filtering medium QF value | 0.74 | 0.74 | 0.70 |
| Unit | Size (mm) | 240 × 255 × 10 | 240 × 255 × 10 | 240 × 255 × 10 |
| | Filtering medium crest height (mm) | 8 | 8 | 8 |
| | Air flow (m³/min) | 525 | 525 | 525 |
| | Filtering medium area (m²) | 0.35 | 0.35 | 0.35 |
| | Filtering medium penetration air rate (m/min) | 25 | 25 | 25 |
| | Unit pressure drop (Pa) | 31.4 | 31 | 37.5 |

TABLE 4-continued

|  | Example 4 | Example 5 | Example 6 |
|---|---|---|---|
| Filtering medium pressure drop (Pa) | 18.9 | 18.9 | 20.0 |
| Structure pressure drop (Pa) | 12.5 | 12.1 | 17.5 |
| Structure pressure drop ratio (%) | 39.8 | 39.1 | 46.7 |
| JIS 15 kinds of dusts permeability $T_2$ | 0.088 | 0.088 | 0.088 |
| JIS 15 kinds of dusts adhesion amount (g/unit) | 16.6 | 16.8 | 16 |
| Filter unit QF value | 0.077 | 0.078 | 0.063 |

PPMB: Polypropylene melt blown non-woven fabric
PP/PET: Friction electrification-processed non-woven fabric of polyester short fiber and polypropylene short fiber

TABLE 5

| | | | Young's modulus [cN/dtex] | Fineness [dtex] | Fiber length [mm] | Example 7 | Example 8 | Example 9 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
| | | | 150 | 3 | 10 | 0 | 0 | 0 |
| | | | 150 | 7 | 10 | 0 | 0 | 0 |
| | | | 180 | 7 | 10 | 24 | 24 | 24 |
| | | | 180 | 7 | 20 | 0 | 0 | 0 |
| | | | 250 | 6.7 | 10 | 0 | 0 | 0 |
| | | | 250 | 17 | 12 | 49 | 49 | 49 |
| | | | 320 | 7 | 10 | 0 | 0 | 0 |
| | | | 320 | 17 | 12 | 0 | 0 | 0 |
| | | | 320 | 17 | 18 | 0 | 0 | 0 |
| | | | 330 | 2.2 | 10 | 0 | 0 | 0 |
| | | Polyester fiber | 65 | 1.3 | 5 | 0 | 0 | 0 |
| | | | 65 | 3 | 10 | 0 | 0 | 0 |
| | | | 65 | 10 | 10 | 0 | 0 | 0 |
| | | | 65 | 17 | 18 | 0 | 0 | 0 |
| | | | 95 | 1.3 | 5 | 9 | 9 | 9 |
| | | | 95 | 3 | 10 | 8 | 8 | 8 |
| | | Aromatic polyamide fiber | 4400 | 17 | 10 | 0 | 0 | 0 |
| | | Core sheath-type polyester fiber | 65 | 9.6 | 15 | 0 | 0 | 0 |
| | | | 65 | 16.2 | 24 | 0 | 0 | 0 |
| | | Polypropylene fiber | 130 | 3 | 15 | 0 | 0 | 0 |
| | | Core sheath-type modified PP/PP | 45 | 2.2 | 10 | 0 | 0 | 0 |
| | | Fibrous binder PVA fiber | 65 | 10 | 7 | 0 | 0 | 0 |
| | Crimped | Polyester fiber | 45 | 6 | 24 | 0 | 0 | 0 |
| | | Polyvinyl alcohol fiber | 120 | 7 | 28 | 0 | 0 | 0 |
| Pulp | | | | | | 10 | 10 | 10 |
| Glass transition temperature Tg [° C.] of resin fixing single fibers | | | | | | 30 | 30 | 30 |
| Particle-like substance | | | | | | 46.7%, 10 μm | 0 | 0 |

TABLE 6

| | | Example 7 | Example 8 | Example 9 |
|---|---|---|---|---|
| Non-woven fabric construction | Non-woven fabric production process | Slant wire | Slant wire | Slant wire |
| | Construction fiber amount (g/m²) | 37.5 | 37.5 | 37.5 |
| | Amount of resin fixing single fibers (g/m²) | 16.05 | 9.3 | 9.3 |
| | Particle-like substance (%/adhesion amount g/m²) | 46.7%/7.5 | 0 | 0 |
| | Non-woven fabric weight (g/m²) | 53.5 | 46.8 | 46.8 |
| | Non-woven fabric thickness (mm) | 0.46 | 0.425 | 0.425 |
| | Air permeability (cm³/cm² · sec) | 348 | 350 | 350 |
| | Non-woven fabric apparent density (g/cm³) | 0.116 | 0.11 | 0.11 |
| | Tensile strength at 1% elongation (N/cm²) | 415 | 381 | 381 |
| | Specific strength (N · cm/g) | 3578 | 3464 | 3464 |
| | Pressure drop (Pa) | 1.7 | 1.7 | 1.7 |
| | Electrification processing (containing PP short fiber) | None | None | None |
| Electrification-processed non-woven fabric | Material | PPMB | PPMB | PP/PET |
| | Fiber diameter (μm) | 6 | 6 | $5_{d\,tex}$ |
| | Weight (g/m²) | 12 | 22 | 16 |
| | Thickness (mm) | 0.12 | 0.21 | 0.2 |
| | Pressure drop (Pa) | 1.8 | 3.7 | 0.5 |
| | 0.3 μm particle permeability | 0.75 | 0.35 | 0.61 |
| | Electrification-processed non-woven fabric QF value | 0.16 | 0.28 | 0.99 |
| Filtering medium | Thickness (mm) | 0.59 | 0.64 | 0.63 |
| | Pressure drop (Pa) | 3.6 | 5.5 | 2.3 |
| | JIS 15 kinds of dusts permeability $T_1$ | 0.08 | 0.02 | 0.1 |
| | Filtering medium QF value | 0.70 | 0.71 | 1.00 |

TABLE 6-continued

|  |  | Example 7 | Example 8 | Example 9 |
|---|---|---|---|---|
| Unit | Size (mm) | 240 × 255 × 10 | 240 × 255 × 10 | 240 × 255 × 10 |
|  | Filtering medium crest height (mm) | 8 | 8 | 8 |
|  | Air flow (m³/min) | 525 | 525 | 525 |
|  | Filtering medium area (m²) | 0.35 | 0.35 | 0.35 |
|  | Filtering medium penetration air rate (m/min) | 25 | 25 | 25 |
|  | Unit pressure drop (Pa) | 41 | 54.5 | 35 |
|  | Filtering medium pressure drop (Pa) | 20.0 | 30.6 | 12.8 |
|  | Structure pressure drop (Pa) | 21.0 | 23.9 | 22.2 |
|  | Structure pressure drop ratio (%) | 51.2 | 43.9 | 63.5 |
|  | JIS 15 kinds of dusts permeability $T_2$ | 0.088 | 0.020 | 0.100 |
|  | JIS 15 kinds of dusts adhesion amount (g/unit) | 15 | 12 | 23 |
|  | Filter unit QF value | 0.059 | 0.072 | 0.066 |

PPMB: Polypropylene melt blown non-woven fabric
PP/PET: Friction electrification-processed non-woven fabric of polyester short fiber and polypropylene short fiber

TABLE 7

|  |  |  | Young's modulus [cN/dtex] | Fineness [dtex] | Fiber length [mm] | Example 10 | Example 11 | Example 12 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
|  |  |  | 150 | 3 | 10 | 0 | 0 | 0 |
|  |  |  | 150 | 7 | 10 | 0 | 0 | 0 |
|  |  |  | 180 | 7 | 10 | 0 | 0 | 0 |
|  |  |  | 180 | 7 | 20 | 0 | 0 | 30 |
|  |  |  | 250 | 6.7 | 10 | 0 | 19 | 0 |
|  |  |  | 250 | 17 | 12 | 0 | 0 | 0 |
|  |  |  | 320 | 7 | 10 | 0 | 0 | 0 |
|  |  |  | 320 | 17 | 12 | 24 | 10 | 0 |
|  |  |  | 320 | 17 | 18 | 49 | 39 | 0 |
|  |  |  | 330 | 2.2 | 10 | 0 | 7 | 0 |
|  |  | Polyester fiber | 65 | 1.3 | 5 | 0 | 0 | 0 |
|  |  |  | 65 | 3 | 10 | 0 | 0 | 0 |
|  |  |  | 65 | 10 | 10 | 0 | 0 | 0 |
|  |  |  | 65 | 17 | 18 | 0 | 0 | 0 |
|  |  |  | 95 | 1.3 | 5 | 0 | 5 | 0 |
|  |  |  | 95 | 3 | 10 | 0 | 10 | 0 |
|  |  | Aromatic polyamide fiber | 4400 | 17 | 10 | 0 | 0 | 0 |
|  |  | Core sheath-type polyester fiber | 65 | 9.6 | 15 | 0 | 0 | 21 |
|  |  |  | 65 | 16.2 | 24 | 0 | 0 | 49 |
|  |  | Polypropylene fiber | 130 | 3 | 15 | 10 (PP) | 0 | 0 |
|  |  | Core sheath-type modified PP/PP | 45 | 2.2 | 10 | 0 | 0 | 0 |
|  |  | Fibrous binder PVA fiber | 65 | 10 | 7 | 17 | 0 | 0 |
|  | Crimped | Polyester fiber | 45 | 6 | 24 | 0 | 0 | 0 |
|  |  | Polyvinyl alcohol fiber | 120 | 7 | 28 | 0 | 0 | 0 |
| Pulp |  |  |  |  |  | 0 | 10 | 0 |
| Glass transition temperature Tg [° C.] of resin fixing single fibers |  |  |  |  |  | 35 | 35 | 0 |
| Particle-like substance |  |  |  |  |  | 0 | 0 | 0 |

TABLE 8

|  |  | Example 10 | Example 11 | Example 12 |
|---|---|---|---|---|
| Non-woven fabric construction | Non-woven fabric production process | Slant wire | Slant wire | Air laid |
|  | Construction fiber amount (g/m²) | 36.7 | 20.4 | 37.5 |
|  | Amount of resin fixing single fibers (g/m²) | 3.3 | 7.6 | 0 |
|  | Particle-like substance (%/adhesion amount g/m²) | 0 | 0 | 0 |
|  | Non-woven fabric weight (g/m²) | 40 | 28 | 37.5 |
|  | Non-woven fabric thickness (mm) | 0.38 | 0.29 | 0.40 |
|  | Air permeability (cm³/cm² · sec) | 320 | 450 | 390 |
|  | Non-woven fabric apparent density (g/cm³) | 0.105 | 0.096 | 0.094 |
|  | Tensile strength at 1% elongation (N/cm²) | 360 | 200 | 120 |
|  | Specific strength (N · cm/g) | 3429 | 2083 | 1277 |
|  | Pressure drop (Pa) | 1.8 | 1.1 | 1.5 |
|  | Electrification processing (containing PP short fiber) | Presence | None | None |
| Electrification-processed non-woven fabric | Material | No lamination | PPMB | PPMB |
|  | Fiber diameter (μm) |  | 5 | 6 |
|  | Weight (g/m²) |  | 10 | 12 |
|  | Thickness (mm) |  | 0.08 | 0.12 |
|  | Pressure drop (Pa) |  | 1.6 | 1.8 |
|  | 0.3 μm particle permeability |  | 0.77 | 0.75 |
|  | Electrification-processed non-woven fabric QF value |  | 0.16 | 0.16 |

TABLE 8-continued

|  |  | Example 10 | Example 11 | Example 12 |
|---|---|---|---|---|
| Filtering medium | Thickness (mm) | 0.38 | 0.37 | 0.53 |
|  | Pressure drop (Pa) | 1.8 | 2.8 | 3.3 |
|  | JIS 15 kinds of dusts permeability $T_1$ | 0.15 | 0.06 | 0.08 |
|  | Filtering medium QF value | 1.05 | 1.00 | 0.77 |
| Unit | Size (mm) | 240 × 255 × 10 | 240 × 255 × 10 | 240 × 255 × 10 |
|  | Filtering medium crest height (mm) | 8 | 8 | 8 |
|  | Air flow (m³/min) | 525 | 525 | 525 |
|  | Filtering medium area (m²) | 0.35 | 0.42 | 0.35 |
|  | Filtering medium penetration air rate (m/min) | 25 | 20.8 | 25 |
|  | Unit pressure drop (Pa) | 32 | 48.9 | 67.8 |
|  | Filtering medium pressure drop (Pa) | 10.0 | 12.9 | 18.3 |
|  | Structure pressure drop (Pa) | 22.0 | 36.0 | 49.5 |
|  | Structure pressure drop ratio (%) | 68.8 | 73.6 | 73.0 |
|  | JIS 15 kinds of dusts permeability $T_2$ | 0.140 | 0.030 | 0.085 |
|  | JIS 15 kinds of dusts adhesion amount (g/unit) | 18 | 21 | 14 |
|  | Filter unit QF value | 0.061 | 0.047 | 0.036 |

PPMB: Polypropylene melt blown non-woven fabric
PP/PET: Friction electrification-processed non-woven fabric of polyester short fiber and polypropylene short fiber

TABLE 9

|  |  |  | Young's modulus [cN/dtex] | Fineness [dtex] | Fiber length [mm] | Example 13 | Example 14 | Example 15 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
|  |  |  | 150 | 3 | 10 | 0 | 0 | 0 |
|  |  |  | 150 | 7 | 10 | 0 | 0 | 0 |
|  |  |  | 180 | 7 | 10 | 0 | 0 | 0 |
|  |  |  | 180 | 7 | 20 | 30 | 0 | 0 |
|  |  |  | 250 | 6.7 | 10 | 0 | 0 | 0 |
|  |  |  | 250 | 17 | 12 | 0 | 40 | 0 |
|  |  |  | 320 | 7 | 10 | 0 | 0 | 0 |
|  |  |  | 320 | 17 | 12 | 0 | 0 | 0 |
|  |  |  | 320 | 17 | 18 | 0 | 0 | 0 |
|  |  |  | 330 | 2.2 | 10 | 0 | 0 | 0 |
|  |  | Polyester fiber | 65 | 1.3 | 5 | 0 | 0 | 0 |
|  |  |  | 65 | 3 | 10 | 0 | 0 | 0 |
|  |  |  | 65 | 10 | 10 | 0 | 0 | 0 |
|  |  |  | 65 | 17 | 18 | 0 | 0 | 0 |
|  |  |  | 95 | 1.3 | 5 | 0 | 0 | 0 |
|  |  |  | 95 | 3 | 10 | 0 | 0 | 0 |
|  |  | Aromatic polyamide fiber | 4400 | 17 | 10 | 0 | 0 | 40 |
|  |  | Core sheath-type polyester fiber | 65 | 9.6 | 15 | 21 | 0 | 0 |
|  |  |  | 65 | 16.2 | 24 | 49 | 0 | 0 |
|  |  | Polypropylene fiber | 130 | 3 | 15 | 0 | 10 | 10 |
|  |  | Core sheath-type modified PP/PP | 45 | 2.2 | 10 | 0 | 50 | 50 |
|  |  | Fibrous binder PVA fiber | 65 | 10 | 7 | 0 | 0 | 0 |
|  | Crimped | Polyester fiber | 45 | 6 | 24 | 0 | 0 | 0 |
|  |  | Polyvinyl alcohol fiber | 120 | 7 | 28 | 0 | 0 | 0 |
|  | Pulp |  |  |  |  | 0 | 0 | 0 |
| Glass transition temperature Tg [° C.] of resin fixing single fibers |  |  |  |  |  | 30 | — | — |
| Particle-like substance |  |  |  |  |  | 0 | — | — |

TABLE 10

|  |  | Example 13 | Example 14 | Example 15 |
|---|---|---|---|---|
| Non-woven fabric construction | Non-woven fabric production process | Air laid | Air laid | Air laid |
|  | Construction fiber amount (g/m²) | 37.5 | 80 | 80 |
|  | Amount of resin fixing single fibers (g/m²) | 2 | 0 | 0 |
|  | Particle-like substance (%/adhesion amount g/m²) | 0 | 0 | 0 |
|  | Non-woven fabric weight (g/m²) | 39.5 | 80 | 80 |
|  | Non-woven fabric thickness (mm) | 0.43 | 0.7 | 0.7 |
|  | Air permeability (cm³/cm² · sec) | 400 | 120 | 150 |
|  | Non-woven fabric apparent density (g/cm³) | 0.092 | 0.114 | 0.114 |
|  | Tensile strength at 1% elongation (N/cm²) | 130 | 120 | 620 |
|  | Specific strength (N · cm/g) | 1413 | 1052 | 5439 |
|  | Pressure drop (Pa) | 1.4 | 4.5 | 4.1 |
|  | Electrification processing (containing PP short fiber) | None | Presence | Presence |
| Electrification-processed non-woven | Material | PPMB | No lamination | No lamination |
|  | Fiber diameter (μm) | 6 |  |  |
|  | Weight (g/m²) | 12 |  |  |

TABLE 10-continued

|  |  | Example 13 | Example 14 | Example 15 |
|---|---|---|---|---|
| fabric | Thickness (mm) | 0.12 | | |
|  | Pressure drop (Pa) | 1.8 | | |
|  | 0.3 μm particle permeability | 0.75 | | |
|  | Electrification-processed non-woven fabric QF value | 0.16 | | |
| Filtering medium | Thickness (mm) | 0.53 | 0.70 | 0.7 |
|  | Pressure drop (Pa) | 3.2 | 4.5 | 4.1 |
|  | JIS 15 kinds of dusts permeability $T_1$ | 0.08 | 0.075 | 0.075 |
|  | Filtering medium QF value | 0.79 | 0.58 | 0.63 |
| Unit | Size (mm) | 240 × 255 × 10 | 240 × 255 × 10 | 240 × 255 × 10 |
|  | Filtering medium crest height (mm) | 8 | 8 | 8 |
|  | Air flow (m³/min) | 525 | 525 | 525 |
|  | Filtering medium area (m²) | 0.35 | 0.28 | 0.28 |
|  | Filtering medium penetration air rate (m/min) | 25 | 31 | 31 |
|  | Unit pressure drop (Pa) | 67.3 | 71 | 49.2 |
|  | Filtering medium pressure drop (Pa) | 17.8 | 31.0 | 28.2 |
|  | Structure pressure drop (Pa) | 49.5 | 40.0 | 23.0 |
|  | Structure pressure drop ratio (%) | 73.6 | 56.3 | 46.7 |
|  | JIS 15 kinds of dusts permeability $T_2$ | 0.085 | 0.074 | 0.072 |
|  | JIS 15 kinds of dusts adhesion amount (g/unit) | 14.6 | 16 | 20 |
|  | Filter unit QF value | 0.037 | 0.037 | 0.053 |

PPMB: Polypropylene melt blown non-woven fabric
PP/PET: Friction electrification-processed non-woven fabric of polyester short fiber and polypropylene short fiber

TABLE 11

|  |  |  | Young's modulus [cN/dtex] | Fineness [dtex] | Fiber length [mm] | Comparative Example 1 | Comparative Example 2 | Comparative Example 3 |
|---|---|---|---|---|---|---|---|---|
| Non-woven fabric construction fiber [mass %] | Non-crimped | Polyvinyl alcohol fiber | 140 | 6 | 7 | 0 | 0 | 0 |
|  |  |  | 150 | 3 | 10 | 0 | 0 | 0 |
|  |  |  | 150 | 7 | 10 | 0 | 0 | 0 |
|  |  |  | 180 | 7 | 10 | 0 | 0 | 0 |
|  |  |  | 180 | 7 | 20 | 0 | 0 | 0 |
|  |  |  | 250 | 6.7 | 10 | 0 | 0 | 0 |
|  |  |  | 250 | 17 | 12 | 0 | 0 | 0 |
|  |  |  | 320 | 7 | 10 | 0 | 0 | 0 |
|  |  |  | 320 | 17 | 12 | 0 | 0 | 0 |
|  |  |  | 320 | 17 | 18 | 0 | 0 | 0 |
|  |  |  | 330 | 2.2 | 10 | 0 | 0 | 0 |
|  |  | Polyester fiber | 65 | 1.3 | 5 | 9 | 9 | 0 |
|  |  |  | 65 | 3 | 10 | 10 | 10 | 0 |
|  |  |  | 65 | 10 | 10 | 25 | 25 | 0 |
|  |  |  | 65 | 17 | 18 | 49 | 49 | 0 |
|  |  |  | 95 | 1.3 | 5 | 0 | 0 | 0 |
|  |  |  | 95 | 3 | 10 | 0 | 0 | 0 |
|  |  | Aromatic polyamide fiber | 4400 | 17 | 10 | | | |
|  |  | Core sheath-type polyester fiber | 65 | 9.6 | 15 | 0 | 0 | 0 |
|  |  |  | 65 | 16.2 | 24 | 0 | 0 | 0 |
|  |  | Polypropylene fiber | 130 | 3 | 15 | 0 | 0 | 0 |
|  |  | Core sheath-type modified PP/PP | 45 | 2.2 | 10 | 0 | 0 | 0 |
|  |  | Fibrous binder PVA fiber | 65 | 10 | 7 | 0 | 0 | 0 |
|  | Crimped | Polyester fiber | 45 | 6 | 24 | 0 | 0 | 50 |
|  |  | Polyvinyl alcohol fiber | 120 | 7 | 28 | 0 | 0 | 50 |
| Pulp |  |  |  |  |  | 7 | 7 | 0 |
| Glass transition temperature Tg [° C.] of resin fixing single fibers |  |  |  |  |  | 30 | 25 | 30 |
| Particle-like substance |  |  |  |  |  | 0 | 0 | 0 |

TABLE 12

|  |  | Comparative Example 1 | Comparative Example 2 | Comparative Example 3 |
|---|---|---|---|---|
| Non-woven fabric construction | Non-woven fabric production process | Slant wire | Slant wire | Dry chemical |
|  | Construction fiber amount (g/m²) | 37.5 | 37.5 | 44.1 |
|  | Amount of resin fixing single fibers (g/m²) | 9.3 | 9.3 | 29.4 |
|  | Particle-like substance (%/adhesion amount g/m²) | 0 | 0 | 0 |
|  | Non-woven fabric weight (g/m²) | 46.8 | 46.8 | 73.5 |
|  | Non-woven fabric thickness (mm) | 0.38 | 0.36 | 0.5 |
|  | Air permeability (cm³/cm² · sec) | 303 | 303 | 95 |
|  | Non-woven fabric apparent density (g/cm³) | 0.123 | 0.13 | 0.147 |
|  | Tensile strength at 1% elongation (N/cm²) | 91.8 | 72.3 | 108 |
|  | Specific strength (N · cm/g) | 746 | 556 | 735 |

TABLE 12-continued

|  |  | Comparative Example 1 | Comparative Example 2 | Comparative Example 3 |
|---|---|---|---|---|
|  | Pressure drop (Pa) | 1.8 | 1.9 | 4.4 |
|  | Electrification processing (containing PP short fiber) | None | None | None |
| Electrification-processed non-woven fabric | Material | PPMB | PPMB | PPMB |
|  | Fiber diameter (μm) | 6 | 6 | 6 |
|  | Weight (g/m$^2$) | 12 | 12 | 12 |
|  | Thickness (mm) | 0.12 | 0.12 | 0.12 |
|  | Pressure drop (Pa) | 1.8 | 1.8 | 1.8 |
|  | 0.3 μm particle permeability | 0.75 | 0.75 | 0.75 |
|  | Electrification-processed non-woven fabric QF value | 0.16 | 0.16 | 0.16 |
| Filtering medium | Thickness (mm) | 0.51 | 0.49 | 0.63 |
|  | Pressure drop (Pa) | 3.7 | 3.8 | 6.3 |
|  | JIS 15 kinds of dusts permeability $T_1$ | 0.09 | 0.09 | 0.09 |
|  | Filtering medium QF value | 0.73 | 0.73 | 0.38 |
| Unit | Size (mm) | 240 × 255 × 10 | 240 × 255 × 10 | 240 × 255 × 10 |
|  | Filtering medium crest height (mm) | 8 | 8 | 8 |
|  | Air flow (m$^3$/min) | 525 | 525 | 525 |
|  | Filtering medium area (m$^2$) | 0.35 | 0.35 | 0.35 |
|  | Filtering medium penetration air rate (m/min) | 25 | 25 | 25 |
|  | Unit pressure drop (Pa) | 83.6 | 88 | 90 |
|  | Filtering medium pressure drop (Pa) | 20.6 | 21.1 | 35.0 |
|  | Structure pressure drop (Pa) | 63.0 | 66.9 | 55.0 |
|  | Structure pressure drop ratio (%) | 75.4 | 76.0 | 61.1 |
|  | JIS 15 kinds of dusts permeability $T_2$ | 0.100 | 0.125 | 0.280 |
|  | JIS 15 kinds of dusts adhesion amount (g/unit) | 9 | 8.5 | 4.6 |
|  | Filter unit QF value | 0.028 | 0.024 | 0.014 |

PPMB: Polypropylene melt blown non-woven fabric
PP/PET: Friction electrification-processed non-woven fabric of polyester short fiber and polypropylene short fiber

TABLE 13

|  |  |  | Young's modulus [cN/dtex] | Fineness [dtex] | Fiber length [mm] | Comparative Example 4 | Comparative Example 5 | Comparative Example 6 |
|---|---|---|---|---|---|---|---|---|
| Non-woven fabric construction fiber [mass %] | Non-crimped | Polyvinyl alcohol fiber | 140 | 6 | 7 | 18 | 40 | 0 |
|  |  |  | 150 | 3 | 10 | 0 | 0 | 0 |
|  |  |  | 150 | 7 | 10 | 0 | 0 | 0 |
|  |  |  | 180 | 7 | 10 | 0 | 0 | 20 |
|  |  |  | 180 | 7 | 20 | 0 | 0 | 0 |
|  |  |  | 250 | 6.7 | 10 | 0 | 0 | 0 |
|  |  |  | 250 | 17 | 12 | 0 | 0 | 0 |
|  |  |  | 320 | 7 | 10 | 0 | 0 | 0 |
|  |  |  | 320 | 17 | 12 | 0 | 0 | 0 |
|  |  |  | 320 | 17 | 18 | 0 | 0 | 0 |
|  |  |  | 330 | 2.2 | 10 | 0 | 0 | 0 |
|  |  | Polyester fiber | 65 | 1.3 | 5 | 0 | 10 | 0 |
|  |  |  | 65 | 3 | 10 | 0 | 40 | 0 |
|  |  |  | 65 | 10 | 10 | 23 | 0 | 21 |
|  |  |  | 65 | 17 | 18 | 49 | 0 | 49 |
|  |  |  | 95 | 1.3 | 5 | 0 | 0 | 0 |
|  |  |  | 95 | 3 | 10 | 0 | 0 | 0 |
|  |  | Aromatic polyamide fiber | 4400 | 17 | 10 |  |  |  |
|  |  | Core sheath-type polyester fiber | 65 | 9.6 | 15 | 0 | 0 | 0 |
|  |  |  | 65 | 16.2 | 24 | 0 | 0 | 0 |
|  |  | Polypropylene fiber | 130 | 3 | 15 | 0 | 0 | 0 |
|  |  | Core sheath-type modified PP/PP | 45 | 2.2 | 10 | 0 | 0 | 0 |
|  |  | Fibrous binder PVA fiber | 65 | 10 | 7 | 0 | 0 | 0 |
|  | Crimped | Polyester fiber | 45 | 6 | 24 | 0 | 0 | 0 |
|  |  | Polyvinyl alcohol fiber | 120 | 7 | 28 | 0 | 0 | 0 |
|  | Pulp |  |  |  |  | 10 | 10 | 10 |
| Glass transition temperature Tg [° C.] of resin fixing single fibers |  |  |  |  |  | 30 | 30 | 25 |
| Particle-like substance |  |  |  |  |  | 0 | 0 | 0 |

TABLE 14

|  |  | Comparative Example 4 | Comparative Example 5 | Comparative Example 6 |
|---|---|---|---|---|
| Non-woven fabric construction | Non-woven fabric production process | Slant wire | Slant wire | Slant wire |
|  | Construction fiber amount (g/m$^2$) | 37.5 | 37.5 | 37.5 |
|  | Amount of resin fixing single fibers (g/m$^2$) | 9.3 | 9.3 | 9.3 |
|  | Particle-like substance (%/adhesion amount g/m$^2$) | 0 | 0 | 0 |

TABLE 14-continued

|  |  | Comparative Example 4 | Comparative Example 5 | Comparative Example 6 |
|---|---|---|---|---|
|  | Non-woven fabric weight (g/m$^2$) | 46.8 | 46.8 | 46.8 |
|  | Non-woven fabric thickness (mm) | 0.4 | 0.32 | 0.4 |
|  | Air permeability (cm$^3$/cm$^2$ · sec) | 330 | 86 | 350 |
|  | Non-woven fabric apparent density (g/cm$^3$) | 0.117 | 0.146 | 0.117 |
|  | Tensile strength at 1% elongation (N/cm$^2$) | 108 | 91.8 | 110 |
|  | Specific strength (N · cm/g) | 923 | 629 | 940 |
|  | Pressure drop (Pa) | 1.7 | 5.0 | 1.7 |
|  | Electrification processing (containing PP short fiber) | None | None | None |
| Electrification-processed non-woven fabric | Material | PPMB | PPMB | PPMB |
|  | Fiber diameter (μm) | 6 | 6 | 6 |
|  | Weight (g/m$^2$) | 12 | 12 | 12 |
|  | Thickness (mm) | 0.12 | 0.12 | 0.12 |
|  | Pressure drop (Pa) | 1.8 | 1.8 | 1.8 |
|  | 0.3 μm particle permeability | 0.75 | 0.75 | 0.75 |
|  | Electrification-processed non-woven fabric QF value | 0.16 | 0.16 | 0.16 |
| Filtering medium | Thickness (mm) | 0.525 | 0.45 | 0.525 |
|  | Pressure drop (Pa) | 3.6 | 6.9 | 3.6 |
|  | JIS 15 kinds of dusts permeability T$_1$ | 0.08 | 0.09 | 0.08 |
|  | Filtering medium QF value | 0.70 | 0.28 | 0.70 |
| Unit | Size (mm) | 240 × 255 × 10 | 240 × 255 × 10 | 240 × 255 × 10 |
|  | Filtering medium crest height (mm) | 8 | 8 | 8 |
|  | Air flow (m$^3$/min) | 525 | 525 | 525 |
|  | Filtering medium area (m$^2$) | 0.35 | 0.35 | 0.35 |
|  | Filtering medium penetration air rate (m/min) | 25 | 25 | 25 |
|  | Unit pressure drop (Pa) | 85 | 126 | 83 |
|  | Filtering medium pressure drop (Pa) | 20.0 | 38.3 | 20.0 |
|  | Structure pressure drop (Pa) | 65.0 | 72.0 | 63.0 |
|  | Structure pressure drop ratio (%) | 76.5 | 57.1 | 75.9 |
|  | JIS 15 kinds of dusts permeability T$_2$ | 0.120 | 0.110 | 0.090 |
|  | JIS 15 kinds of dusts adhesion amount (g/unit) | 8 | 6.6 | 13 |
|  | Filter unit QF value | 0.025 | 0.018 | 0.029 |

PPMB: Polypropylene melt blown non-woven fabric
PP/PET: Friction electrification-processed non-woven fabric of polyester short fiber and polypropylene short fiber

TABLE 15

|  |  |  | Young's modulus [cN/dtex] | Fineness [dtex] | Fiber length [mm] | Comparative Example 7 | Comparative Example 8 |
|---|---|---|---|---|---|---|---|
| Non-woven fabric construction fiber [mass %] | Non-crimped | Polyvinyl alcohol fiber | 140 | 6 | 7 | 0 | 0 |
|  |  |  | 150 | 3 | 10 | 0 | 25 |
|  |  |  | 150 | 7 | 10 | 15 | 0 |
|  |  |  | 180 | 7 | 10 | 0 | 0 |
|  |  |  | 180 | 7 | 20 | 0 | 0 |
|  |  |  | 250 | 6.7 | 10 | 0 | 0 |
|  |  |  | 250 | 17 | 12 | 0 | 0 |
|  |  |  | 320 | 7 | 10 | 0 | 0 |
|  |  |  | 320 | 17 | 12 | 0 | 0 |
|  |  |  | 320 | 17 | 18 | 0 | 0 |
|  |  |  | 330 | 2.2 | 10 | 0 | 0 |
|  |  | Polyester fiber | 65 | 1.3 | 5 | 0 | 0 |
|  |  |  | 65 | 3 | 10 | 0 | 0 |
|  |  |  | 65 | 10 | 10 | 26 | 16 |
|  |  |  | 65 | 17 | 18 | 49 | 49 |
|  |  |  | 95 | 1.3 | 5 | 0 | 0 |
|  |  |  | 95 | 3 | 10 | 0 | 0 |
|  |  | Aromatic polyamide fiber | 4400 | 17 | 10 |  |  |
|  |  | Core sheath-type polyester fiber | 65 | 9.6 | 15 | 0 | 0 |
|  |  |  | 65 | 16.2 | 24 | 0 | 0 |
|  |  | Polypropylene fiber | 130 | 3 | 15 | 0 | 0 |
|  |  | Core sheath-type modified PP/PP | 45 | 2.2 | 10 | 0 | 0 |
|  |  | Fibrous binder PVA fiber | 65 | 10 | 7 | 0 | 0 |
|  | Crimped | Polyester fiber | 45 | 6 | 24 | 0 | 0 |
|  |  | Polyvinyl alcohol fiber | 120 | 7 | 28 | 0 | 0 |
|  | Pulp |  |  |  |  | 10 | 10 |
| Glass transition temperature Tg [° C.] of resin fixing single fibers |  |  |  |  |  | 30 | 30 |
| Particle-like substance |  |  |  |  |  | 0 | 0 |

TABLE 16

|  |  | Comparative Example 7 | Comparative Example 8 |
|---|---|---|---|
| Non-woven fabric construction | Non-woven fabric production process | Slant wire | Slant wire |
|  | Construction fiber amount (g/m$^2$) | 37.5 | 37.5 |
|  | Amount of resin fixing single fibers (g/m$^2$) | 9.3 | 9.3 |
|  | Particle-like substance (%/adhesion amount g/m$^2$) | 0 | 0 |
|  | Non-woven fabric weight (g/m$^2$) | 46.8 | 46.8 |
|  | Non-woven fabric thickness (mm) | 0.405 | 0.37 |
|  | Air permeability (cm$^3$/cm$^2 \cdot$ sec) | 352 | 95 |
|  | Non-woven fabric apparent density (g/cm$^3$) | 0.116 | 0.117 |
|  | Tensile strength at 1% elongation (N/cm$^2$) | 105 | 98 |
|  | Specific strength (N · cm/g) | 905 | 838 |
|  | Pressure drop (Pa) | 1.7 | 4.4 |
|  | Electrification processing (containing PP short fiber) | None | None |
| Electrification-processed non-woven fabric | Material | PPMB | PPMB |
|  | Fiber diameter (μm) | 6 | 6 |
|  | Weight (g/m$^2$) | 12 | 12 |
|  | Thickness (mm) | 0.12 | 0.12 |
|  | Pressure drop (Pa) | 1.8 | 1.8 |
|  | 0.3 μm particle permeability | 0.75 | 0.75 |
|  | Electrification-processed non-woven fabric QF value | 0.16 | 0.16 |
| Filtering medium | Thickness (mm) | 0.53 | 0.495 |
|  | Pressure drop (Pa) | 3.6 | 6.3 |
|  | JIS 15 kinds of dusts permeability T$_1$ | 0.0805 | 0.08 |
|  | Filtering medium QF value | 0.70 | 0.70 |
| Unit | Size (mm) | 240 × 255 × 10 | 240 × 255 × 10 |
|  | Filtering medium crest height (mm) | 8 | 8 |
|  | Air flow (m$^3$/min) | 525 | 525 |
|  | Filtering medium area (m$^2$) | 0.35 | 0.35 |
|  | Filtering medium penetration air rate (m/min) | 25 | 25 |
|  | Unit pressure drop (Pa) | 90 | 103 |
|  | Filtering medium pressure drop (Pa) | 20.0 | 35.0 |
|  | Structure pressure drop (Pa) | 70.0 | 68.0 |
|  | Structure pressure drop ratio (%) | 77.8 | 71.0 |
|  | JIS 15 kinds of dusts permeability T$_2$ | 0.093 | 0.096 |
|  | JIS 15 kinds of dusts adhesion amount (g/unit) | 12 | 8 |
|  | Filter unit QF value | 0.026 | 0.016 |

PPMB: Polypropylene melt blown non-woven fabric
PP/PET: Friction electrification-processed non-woven fabric of polyester short fiber and polypropylene short fiber The filtering medium and the filtering unit of embodiments of the present invention can be suitably used in machines and instruments such as household air cleaner filters, air conditioning filters for buildings/factories, automobile filters and the like.

The invention claimed is:

1. A filtering medium having a non-woven fabric containing mainly an organic fiber, in which single fibers are fixed with resin or thermal adhesive fiber, wherein the non-woven fabric has a specific strength at 1% elongation of 1000 N·cm/g or more and air permeability of 100 cm$^3$/cm$^2$·sec or more; wherein an apparent density of the non-woven fabric is no less than 0.08 g/cm$^3$ and is no more than 0.18 g/cm$^3$; and wherein a non-crimped single fiber having Young's modulus of 150 cN/dtex or more to 3000 cN/dtex or less, and a fineness of 7 dtex or more, is contained at a ratio of 20% or more of a total fiber mass.

2. The filtering medium according to claim 1, wherein the non-woven fabric is constructed of a plurality of single fibers having different Young's moduli and finenesses, and single fibers are fixed with a resin having a glass transition temperature of 30° C. or more.

3. The filtering medium according to claim 2, wherein as a single fiber constituting the non-woven fabric, a non-crimped organic single fiber having a Young's modulus of 200 cN/dtex or more, a fineness of 10 dtex or more, and a fiber length of 8 to 25 mm is contained at a ratio of 10% or more of a total fiber mass.

4. The filtering medium according to claim 2, wherein as a single fiber constituting the non-woven fabric, an organic single fiber having a Young's modulus of 60 cN/dtex or more, and a fineness of 1 to 6 dtex is contained at a ratio of 30% or less of a total fiber mass.

5. The filtering medium according to claim 1, wherein as a single fiber constituting the non-woven fabric, an electrification fiber is contained.

6. The filtering medium according to claim 1, wherein an electrification-processed non-woven fabric is further laminated on the non-woven fabric.

7. The filtering medium according to claim 1, wherein a filtering medium quality factor obtained from permeability of 15 kinds of dusts and a filtering medium initial pressure drop described in JIS Z8901 (1974) obtained on the basis of JIS B9908 (2001)-format 3 test method is 0.4 or more.

8. A filter unit in which the filtering medium described in claim 1 is installed in a frame body, wherein a filtering medium quality factor obtained from permeability of 15 kinds of dusts and a filtering medium initial pressure drop described in JIS Z8901 (1974) obtained on the basis of JIS B9908 (2001)-format 3 test method is 0.03 or more.

9. The filter unit according to claim 8, which is for automobile air conditioning.

10. A process for producing a filtering medium, including dispersing fibers containing at least non-crimped single fiber in a fluid, converting them into a fiber aggregation, and fixing single fibers to obtain the filter medium described in claim 1.

* * * * *